US012688639B2

(12) United States Patent
Yuan et al.

(10) Patent No.: US 12,688,639 B2
(45) Date of Patent: Jul. 21, 2026

(54) ANIMATABLE CHARACTER GENERATION USING 3D REPRESENTATIONS

(71) Applicant: NVIDIA Corporation, Santa Clara, CA (US)

(72) Inventors: Ye Yuan, Santa Clara, CA (US); Xueting Li, San Jose, CA (US); Umar Iqbal, Danville, CA (US); Koki Nagano, Playa Vista, CA (US); Shalini De Mello, San Francisco, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 277 days.

(21) Appl. No.: 18/623,745

(22) Filed: Apr. 1, 2024

(65) Prior Publication Data

US 2025/0157114 A1      May 15, 2025

Related U.S. Application Data

(60) Provisional application No. 63/548,261, filed on Nov. 13, 2023.

(51) Int. Cl.
G06T 17/20       (2006.01)
G06T 13/40       (2011.01)

(52) U.S. Cl.
CPC .............. G06T 13/40 (2013.01); G06T 17/20 (2013.01)

(58) Field of Classification Search
None
See application file for complete search history.

(56) References Cited

U.S. PATENT DOCUMENTS

| | | |
|---|---|---|
| 2024/0135630 A1 | 4/2024 | Nagano et al. |
| 2024/0161468 A1 | 5/2024 | Li et al. |
| 2024/0193848 A1 | 6/2024 | Wang et al. |
| 2024/0203052 A1 | 6/2024 | Foco et al. |

FOREIGN PATENT DOCUMENTS

DE      10 2023 134 987 A1      6/2024

OTHER PUBLICATIONS

Tang et al., "DreamGaussian: Generative Gaussian Splatting for Efficient 3D Content Creation", 2023. (Year: 2023).*

* cited by examiner

*Primary Examiner* — Nicholas R Wilson
(74) *Attorney, Agent, or Firm* — Foley & Lardner LLP

(57)      ABSTRACT

In various examples, systems and methods are disclosed relating to generating animatable characters or avatars. The system can assign a plurality of first elements of a three-dimensional (3D) model of a subject to a plurality of locations on a surface of the subject in an initial pose. Further, the system can assign a plurality of second elements to the plurality of first elements, each second element of the plurality of second elements having an opacity corresponding to a distance between the second element and the surface of the subject. Further, the system can update the plurality of second elements based at least on a target pose for the subject and one or more attributes of the subject to determine a plurality of updated second elements. Further, the system can render a representation of the subject based at least on the plurality of updated second elements.

20 Claims, 11 Drawing Sheets

300

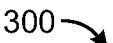

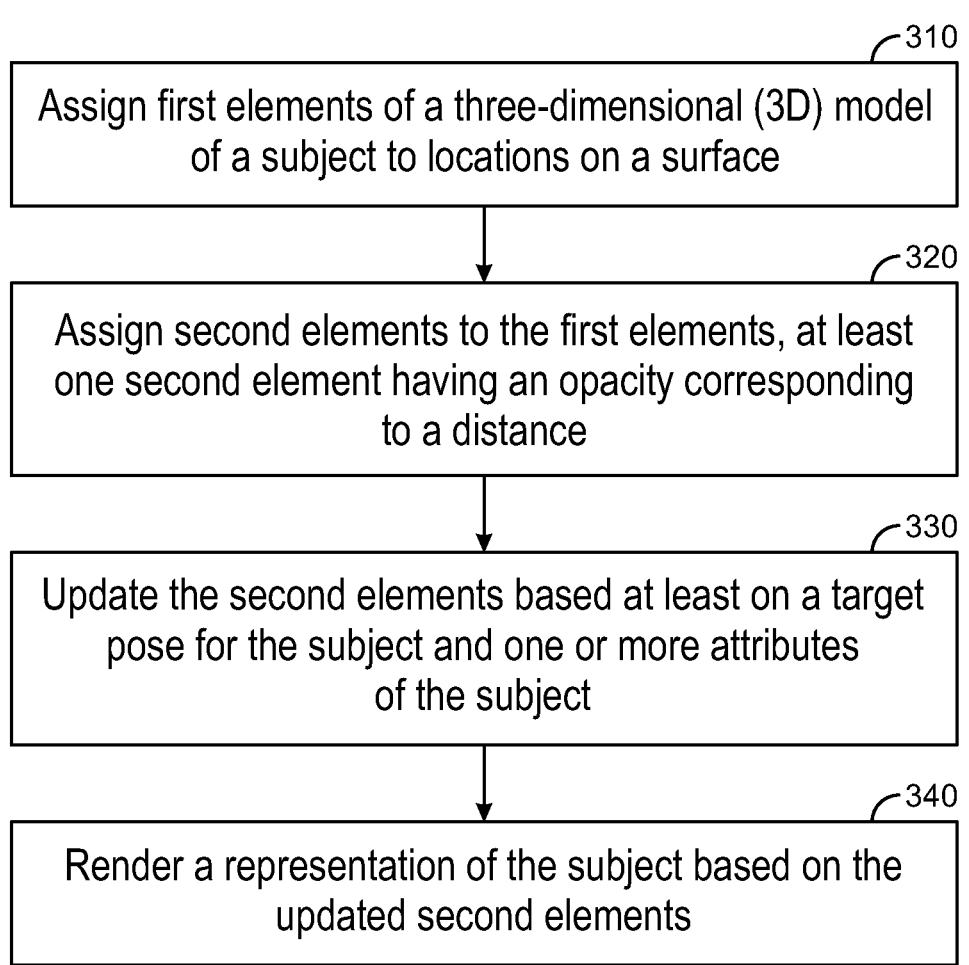

300

310

Assign first elements of a three-dimensional (3D) model of a subject to locations on a surface

320

Assign second elements to the first elements, at least one second element having an opacity corresponding to a distance

330

Update the second elements based at least on a target pose for the subject and one or more attributes of the subject

340

Render a representation of the subject based on the updated second elements

904
Memory

914
I/O Components

906
CPU(s)

916
Power Supply

908
GPU(s)

918
Presentation
Component(s)

910
Comm. Interface

920
Logic Unit(s)

912
I/O Port(s)

902

ANIMATABLE CHARACTER GENERATION USING 3D REPRESENTATIONS

CROSS-REFERENCE TO RELATED APPLICATIONS

The present application claims the benefit of and priority to U.S. Provisional Application No. 63/548,261, filed Nov. 13, 2023, the entire contents of which are incorporated herein by reference in their entirety.

BACKGROUND

Machine learning models, such as neural networks, can be used to represent objects. For example, these models can capture the interplay of shapes, textures, and lighting to construct digital representations that resemble physical objects. However, creating models that accurately represent three-dimensional objects is challenging due to the complexity of capturing the range of geometric details and appearance nuances of three-dimensional objects. Additionally, the rendering of such models into a visual format often requires significant computational resources, which can limit the speed and efficiency of generating real-time or near real-time animations or interactive simulations. Furthermore, the models fail to meet performance criteria when used to generalize across various instances without overfitting to particular examples.

SUMMARY

Implementations of the present disclosure relate to the generation of diverse animatable avatars. In contrast to conventional systems, such as those that rely heavily on manual modeling and mesh-based frameworks, the systems and methods described herein can combine Gaussians with pose-driven primitives and implicit neural fields. This hybrid implementation enables the dynamic representation of complex, high-fidelity 3D characters through the manipulation of Gaussian parameters (e.g., position, scale, orientation, opacity, color) informed by textual descriptions. For example, the systems and methods can use implicit neural fields for the prediction of Gaussian attributes, allowing the generation of detailed and accurate textures and geometries. Furthermore, by utilizing a Signed Distance Function (SDF)-based implicit mesh learning, the disclosure provides improvements to the stability and efficiency of learning many Gaussians while also improving the extraction and rendering of intricate avatar or other character type details. This allows the systems and methods to produce animatable avatars or other character types with improved levels of detail and realism, optimized for both appearance and geometric precision, facilitating high-speed rendering used in real-time or near real-time applications.

At least one implementation relates to one or more processors. The one or more processors can include one or more circuits that can be used to assign a plurality of first elements of a three-dimensional (3D) model of a subject to a plurality of locations on a surface of the subject in an initial pose. The one or more circuits can assign a plurality of second elements to the plurality of first elements, each second element of the plurality of second elements having an opacity corresponding to a distance between the second element and the surface of the subject. The one or more circuits can update the plurality of second elements based at least on a target pose for the subject and one or more attributes of the subject to determine a plurality of updated second elements. The one or more circuits can render a representation of the subject based at least on the plurality of updated second elements.

In some implementations, the one or more circuits are to update the plurality of updated second elements based at least on evaluation of one or more objective functions and the representation of the subject. In some implementations, the one or more circuits are to determine the opacity of each second element of the plurality of second elements using a signed distance function to represent the distance between the second element and the surface of the subject.

In some implementations, at least one first element of the plurality of first elements includes a location parameter corresponding to the location of the plurality of locations to which the at least one element is assigned, a scale parameter indicative of a scale of the at least one first element in a 3D frame of reference in which the subject is positioned, and an orientation parameter indicative of an orientation of the subject relative to the 3D frame of reference. In some implementations, at least one second element of the plurality of second elements includes a 3D Gaussian splatting defined in a local frame of reference of a corresponding at least one first element of the plurality of first elements.

In some implementations, the one or more circuits are to receive an indication of the one or more attributes of the subject as at least one of text data, speech data, audio data, image data, or video data. In some implementations, the one or more processors are to regularize the plurality of second elements based at least on position data of each second element of the plurality of second elements. In some implementations, the one or more processors are to update the plurality of updated second elements based at least on a mask determined from the representation of the subject and an alpha rendering determined from the plurality of updated second elements. In some implementations, the one or more circuits are to generate the representation to include a textured mesh of the subject.

At least one implementation relates a system including one or more processing units to execute operations. The one or more processing units can execute operations to assign a plurality of first elements of a three-dimensional (3D) model of a subject to a plurality of locations on a surface of the subject in an initial pose. The one or more processing units can execute operations to assign a plurality of second elements to the plurality of first elements, each second element of the plurality of second elements having an opacity corresponding to a distance between the second element and the surface of the subject. The one or more processing units can execute operations to update the plurality of second elements based at least on a target pose for the subject and one or more attributes of the subject to determine a plurality of updated second elements. The one or more processing units can execute operations to render a representation of the subject based at least on the plurality of updated second elements.

In some implementations, the one or more processing units are to update the plurality of updated second elements based at least on evaluation of one or more objective functions and the representation of the subject. In some implementations, the one or more processing units are to determine the opacity of each second element of the plurality of second elements using a signed distance function to represent the distance between the second element and the surface of the subject. In some implementations, at least one first element of the plurality of first elements includes a location parameter corresponding to the location of the plurality of locations to which the at least one element is assigned, a scale parameter indicative of a scale of the at least one first element in a 3D frame of reference in which the subject is positioned, and an orientation parameter indicative of an orientation of the subject relative to the 3D frame of reference.

In some implementations, at least one second element of the plurality of second elements includes a 3D Gaussian splatting defined in a local frame of reference of a corresponding at least one first element of the plurality of first elements. In some implementations, the one or more processing units are to receive an indication of the one or more attributes of the subject as at least one of text data, speech data, audio data, image data, or video data. In some implementations, the one or more processing units are to regularize the plurality of second elements based at least on position data of each second element of the plurality of second elements.

In some implementations, the one or more processing units are to update the plurality of updated second elements based at least on a mask determined from the representation of the subject and an alpha rendering determined from the plurality of updated second elements, and wherein the one or more processing units are to generate the representation to include a textured mesh of the subject.

At least one implementation relates to a method. The method can include assigning, by one or more processors, a plurality of first elements of a three-dimensional (3D) model of a subject to a plurality of locations on a surface of the subject in an initial pose. The method can include assigning, by the one or more processors, a plurality of second elements to the plurality of first elements, each second element of the plurality of second elements having an opacity corresponding to a distance between the second element and the surface of the subject. The method can include updating, by the one or more processors, the plurality of second elements based at least on a target pose for the subject and one or more attributes of the subject to determine a plurality of updated second elements. The method can include rendering, by the one or more processors, a representation of the subject based at least on the plurality of updated second elements.

In some implementations updating the plurality of updated second elements is based at least on evaluation of one or more objective functions and the representation of the subject, and wherein the determination of the opacity of each second element of the plurality of second elements includes using a signed distance function to represent the distance between the second element and the surface of the subject.

The processors, systems, and/or methods described herein can be implemented by or included in at least one of a system for generating synthetic data; a system for performing simulation operations; a system for performing conversational AI operations; a system for performing collaborative content creation for 3D assets; a system that includes one or more language models, such as large language models (LLMs); a system for generating or presenting virtual reality (VR) content, augmented reality (AR) content, and/or mixed reality (MR) content; a system for performing digital twin operations; a system for performing light transport simulation; a system for performing deep learning operations; a system implemented using an edge device; a system implemented using a robot; a system associated with an autonomous or semi-autonomous machine (e.g., an in-vehicle infotainment system); a system incorporating one or more virtual machines (VMs); a system implemented at least partially in a data center; or a system implemented at least partially using cloud computing resources.

BRIEF DESCRIPTION OF THE DRAWINGS

The present systems and methods for machine learning models for animatable object generation are described in detail below with reference to the attached drawing figures, wherein:

FIG. 3 is a flow diagram of an example of a method for generating animatable objects, in accordance with some embodiments of the present disclosure;

DETAILED DESCRIPTION

Figure 1:
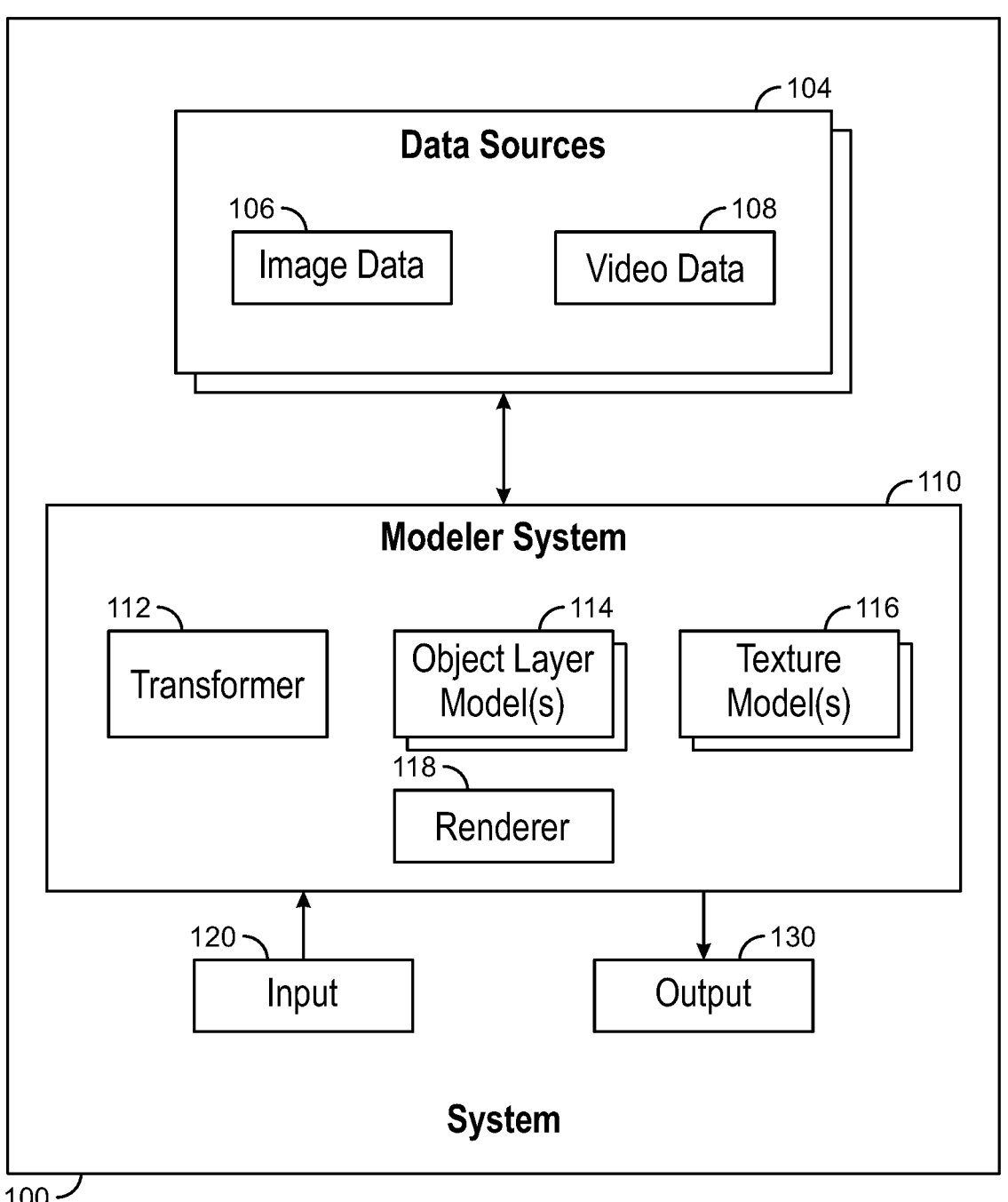
FIG. 1 is a block diagram of an example system for generating animatable objects, in accordance with some embodiments of the present disclosure.

This disclosure relates to systems and methods for animatable character generation using three-dimensional (3D) representations, such as a primitive-based 3D Gaussian (e.g., Gaussian splats, Gaussian splatting) representation. For example, systems and methods in accordance with the present disclosure can allow for text and other inputs to inform attributes of a subject, such as an animatable avatar, which can be used to configure and/or optimize a 3D model of the subject using 3D Gaussians.

Various 3D modeling techniques, such as mesh representations and neural radiance fields (NeRFs), can be used to generate 3D representations of subjects, as well as to allow for deformation (e.g., movement) of the subjects. However, mesh representations can have low rendering quality due to limitations of the underlying geometry of the mesh. NeRFs are highly computationally intensive, particularly for rendering high-resolution images, and thus unlikely to successfully generate fine geometry details such as loose clothing. In addition, various such techniques can fail to properly represent poses that are out of the distribution underlying the representations, such as unseen body poses and complex body geometries.

Systems and methods in accordance with the present disclosure can allow for more realistic and/or configurable subject animation by using 3D models of a subject that include 3D Gaussians assigned to primitives, such as primitives defined using a skeleton-based parametric model. For example, a plurality of first elements (e.g., primitives) can be assigned to a surface of the subject. A plurality of second elements (e.g., 3D Gaussians) can be assigned to the first elements, such as to assign multiple second elements to each of the first elements. The 3D Gaussians can represent features of the subject and/or scene with color, opacity, scales, and rotations. The use of primitives for the avatars or other character types can allow for more natural animation of subject movement (which can be challenging with Gaussians), and the use of the Gaussians can allow for efficient modeling, including of fine details.

In some implementations, the attributes of the Gaussians are predicted using fields, such as neural implicit fields. This can be performed for attributes such as color, rotation, scaling, and/or opacity. This can allow for more stable Gaussian training, such as to mitigate noisy geometry and/or rendering. The attributes can be predicted based on inputs such as text, speech, audio, image, and/or video data. In some implementations, the geometry of the Gaussians is determined based on a distance between the Gaussians and a surface of the subject. For example, the opacity of the Gaussians can be determined based on a signed distance field (SDF) function corresponding to the distance to the surface. This can address the transparent point cloud characteristic of 3D Gaussians, which might otherwise result in holes or other non-realistic features for the subjects.

The 3D model (e.g., the 3D Gaussians) can be used to render images of the subject in various manners. For example, a textured mesh can be extracted from the 3D model, and can be rapidly rendered to meet performance criteria, such as for animation. Various objectives can be used to facilitate realistic generation of the 3D model, such as to optimize the 3D model. The objectives can include one or more score distillation sampling (SDS) objectives to update and/or optimize parameters of the 3D model, such as for the shape, consistency, and/or color of the 3D model. The objectives can include a regularization objective to regularize the geometry of the avatar, and can include an alpha loss objective to match a mask rendered from the extracted mesh with the 3D model's alpha rendering.

The systems and methods described herein may be used for a variety of purposes, by way of example and without limitation, for synthetic data generation, machine control, machine locomotion, machine driving, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be included in a variety of different systems such as systems for performing synthetic data generation operations, automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems implementing one or more language models, such as large language models (LLMs) and/or visual language models (VLMs), systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example computing environment including a system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 can include any function, model (e.g., machine learning model), operation, routine, logic, or instructions to perform functions such as transformer 112, object layer model 114, texture model 116, and/or renderer 118 as described herein, such as to configure machine learning models to generate animatable characters using 3D representations.

The system 100 can include or be coupled with one or more data sources 104. The data sources 104 can include any of various databases, data sets, or data repositories, for example. The data sources 104 can include data to be used for configuring any of various machine learning models (e.g., object layer modeler 114; texture model 116). The one or more data sources 104 can be maintained by one or more entities, which may be entities that maintain the system 100 or may be separate from entities that maintain the system 100. In some implementations, the system 100 uses data from different data sets, such as by using data from a first data source 104 to perform at least a first configuring (e.g., updating or training) of the models 114 and 116, and uses training data elements from a second data source 104 to perform at least a second configuring of the models 114 and 116. For example, the first data source 104 can include publicly available data, while the second data source 104 can include domain-specific data (which may be limited in access as compared with the data of the first data source 104). The image data 106 and video data 108 can include data from any suitable image or video datasets including labeled and/or unlabeled image or video data. In some examples, the data sources 104 include data from large-scale image or video datasets (e.g., ImageNet) that are available from various sources and services.

The data sources 104 can include, without limitation, image data 106 and video data 108 such as any one or more of text, speech, audio, image, and/or video data. The system 100 can perform various pre-processing operations on the data, such as filtering, normalizing, compression, decompression, upscaling or downscaling, cropping, and/or conversion to grayscale (e.g., from image and/or video data). Images (e.g., including video) of the image data 106 and video data 108 can correspond to one or more views of a scene captured by an image or video capture device (e.g., camera), or images generated computationally, such as simulated or virtual images or video (e.g., including by being modifications of images from an image capture device). The images can each include a plurality of pixels, such as pixels arranged in rows and columns. The images can include image data assigned to one or more pixels of the images, such as color, brightness, contrast, intensity, depth (e.g., for three-dimensional (3D) images), or various combinations thereof. The video data 108 can include videos and/or video data structured as a plurality of frames (e.g., image frames, video frames), such as in a sequence of frames, where each frame is assigned a time index (e.g., time step, time point) and has image data assigned to one or more pixels of the images.

In some implementations, the image data 106 and/or video data 108 includes camera pose information. The camera pose information can indicate a point of view by which the data is represented. For example, the camera pose information can indicate at least one of a position or an orientation of a camera (e.g., real or virtual camera) by which the image data 106 and/or video data 108 is captured or represented.

The system 100 can train, update, or configure one or more models of modeler system 110 (e.g., machine learning models). The machine learning models (e.g., object layer models 114 and texture models 116) can include machine learning models or other models that can generate target outputs based on various types of inputs. The machine learning models may include one or more neural networks. The neural network can include an input layer, an output layer, and/or one or more intermediate layers, such as hidden layers, which can each have respective nodes. The system 100 can train/update the neural network by modifying or updating one or more parameters, such as weights and/or biases, of various nodes of the neural network responsive to evaluating candidate outputs of the neural network.

The machine learning models (e.g., object layer models 114 and texture models 116 of modeler system 110) can be or include various neural network models, including models that are effective for operating on or generating data (e.g., objects such as avatars, persons, animals, characters, animations, etc.) including but not limited to image data, video data, text data, speech data, audio data, 3D model data, CAD data, or various combinations thereof. The machine learning models can include one or more transformers, recurrent neural networks (RNNs), long short-term memory (LSTM) models, other network types, or various combinations thereof. The machine learning models can include generative models, such as generative adversarial networks (GANs), Markov decision processes, variational autoencoders (VAEs), Bayesian networks, autoregressive models, autoregressive encoder models (e.g., a model that includes an encoder to generate a latent representation (e.g., in an embedding space) of an input to the model (e.g., a representation of a different dimensionality than the input), and/or a decoder to generate an output representative of the input from the latent representation), or various combinations thereof.

As depicted in FIG. 1, the modeler system 110 can receive an input 120, and can generate output(s) 130 responsive to the input 120. The input 120 can include any one or more text, speech, audio, image, other sensor modality data (e.g., LiDAR, RADAR, ultrasonic, depth, etc. data), 3D asset data, CAD data, and/or video input data, based at least on which the modeler system 110 can generate outputs, such as to generate 2D image, 3D image, and/or video outputs. For example, the input 120 can represent text information such as "a person wearing a red hoody with blue jeans," responsive to which the modeler system 110 can generate an animatable object (e.g., character or avatar) using 3D representations.

The modeler system 110 can learn the positions of the primitives. For example, sets of primitives can be geometric shapes positioned over an object's surface in a configuration. The modeler system 110 can also learn the properties of the Gaussians inside each primitive such that is represents the overall shape and color of the object. For example, a Gaussian can be a function applied within each primitive to model details such as contours and textures of the object's characteristics like shape, color, opacity, and rotation. The modeler system 110 can include a transformer 112 that can assign a plurality of primitives (e.g., first elements) of a three-dimensional (3D) model of a subject to a plurality of locations on a surface of the subject in an initial pose (or rest pose). For example, the transformer 112 can generate a foundational set of geometric primitives, such as cubes, from a predefined rest pose (sometimes referred to as a "rest position" or "initial pose"). In some implementations, each primitive can have one or more attributes—e.g., position, rotation (e.g., along the X, Y, and Z axes), and scale-allowing for adjustments in size to fit an underlying template mesh. For example, the template mesh can be used to mirror the contours and topology of a human body (or another object), allowing the primitives to adhere closely to a human figure, capturing the human figures posture in a static or rest state.

In some implementations, the transformer 112 can determine the placement of the primitives such that each primitive is overlaid on the surface of the object. This can allow the modeler 112, to at least an initial level of accuracy, capture the nuanced geometrical and visual features of the object, including, but not limited to the shape, attire, and hair of a person in the rest pose. The accuracy of the primitive placements by the transformer 112 can influence the object layer model 114 and texture model 116 in representing the object with increased accuracy, for example, when an avatar's arm moves, the corresponding primitives are configured by the transformer 112 such that the motion is represented.

In some implementations, the transformer 112 can assign a plurality of 3D Gaussians (e.g., second elements) to the plurality of primitives (e.g., first elements). For example, within each geometric primitive that is generated by the transformer 112, a series of Gaussian distributions can be defined (e.g., shown as dots within a cube in FIG. 2). The Gaussians can be characterized by their position, orientation (rotation), and scale within the primitive, together with the Gaussians fixed size, color, and shape. The multi-layered implementation allows the modeler system 110 to generate realistic and/or improved subject configurations. The transition of Gaussians from a local coordinate system within the primitives to a global context, where the Gaussians are aligned with the actual surface of the object, is performed using a local-to-world position transformation by transformer 112. The transformation can conform each Gaussian to the surface contours of the underlying object, thereby capturing external appearance (e.g., of the avatar) and any specific details like clothing folds or hair strands (e.g., of the avatar). For example, the transformer 112 can generate a detailed representation of both the geometrical structure and the surface characteristics of the object. Additional information regarding the transformer 112 is described in greater detail below with reference to FIG. 2.

The object layer model(s) 114 of modeler system 110 can be a first pre-trained neural network that receives as input the transformation of each Gaussian. The object layer models 114 can provide a geometric base by generating a Signed Distance Field (SDF) that delineates the underlying geometry of both the avatar and the encompassed 3D Gaussians. The SDF can represent a scalar field where each point's value signifies its shortest distance to the surface of the avatar, with negative values indicating points inside the geometry and positive values for points outside. For example, the opacity of each Gaussian is directed from the SDF, with the distance influencing the transparency to create a realistic rendering of the avatar. The relationship distill that Gaussians aligned with the avatar's surface contribute more to the visual output, while the further away contribute less. Additionally, a differentiable marching tetrahedra (DMTet) can be employed by the object layer models 114 to convert the SDF into a mesh representation of the avatar. The mesh can form the visual structure upon which textures and other surface details are applied. Additional information regarding the object layer model models 114 are described in greater detail below with reference to FIG. 2.

The texture models 116 of modeler system 110 can be a second pre-trained neural network that receives as input the transformation of each Gaussian. The texture models 116 can characterize the visual aspects of the avatar, employing neural implicit fields to allocate color, rotation, scaling, and opacity to each Gaussian. For example, the texture models 116 can utilize the transformed Gaussian positions within the global coordinate system to assign visual attributes that augment the avatar's lifelikeness or realness. By querying the canonical position $$\hat{p}_k^i(\theta)$$

through neural fields $\mathcal{H}_p$ and $\mathcal{O}_\psi$, the texture models 116 can ensure the Gaussians' properties are consistently and smoothly varied across the avatar's surface. Additional information regarding the texture models 116 are described in greater detail below with reference to FIG. 2.

The renderer 118 of the modeler system 110 can apply the updated Gaussian positions and attributes through Gaussian splatting to produce the avatar's visual representation (or object's visual representation). In some implementations, Gaussian splatting can include the process of projecting the Gaussians' color and opacity onto the image plane, synthesizing a composite image that captures the target pose with refined motion and surface details. The renderer 118 aggregates or compiles contribution from the individual Gaussians into a unified visual field that accurately represents the avatar in the desired pose. For example, the renderer 118 can create both an RGB image I and an alpha image $I_\alpha$ from the updated positions and attributes of 3D Gaussians.

In greater detail, the renderer 118 projects the color information of the Gaussians onto an image plane to generate the RGB image I, capturing the avatar's appearance (e.g., as dictated by the text prompt). Simultaneously, the renderer 118 computes the alpha image, $I_\alpha$, encoding the transparency levels of the Gaussians, which facilitates the blending of the avatar with various backgrounds and provides visual continuity in the rendered scene. The combination of the RGB and alpha images contributes to the realism of the avatar by allowing fine visual effects, such as soft transitions at the edges of the avatar and between overlapping Gaussians. To maintain the spatial integrity of the representation and/or to prevent the Gaussians from deviating from their designated positions relative to the primitives, the renderer 118 can apply a local position regularization loss, $$\mathcal{L}_{pos} = \sum_{k,i} \|p_k^i\|^2,$$

which can limit the Gaussians to be within a certain radius of their associated primitive's origin. This constraint verifies that the Gaussians contribute to a coherent visual field when the composite image is synthesized via splatting. The resulting visual output is then leveraged to calculate the score distillation sampling (SDS) loss, as defined in Equation 2 (below). Through the splatting process, the renderer 118 consolidates the various attributes and positions of the Gaussians to form an interconnected and continuous visual representation of the avatar. Additional information regarding the renderer 118 is described in greater detail below with reference to FIG. 2.

Referring further to FIG. 1, the system 100 can receive one or more inputs 120. The input 120 can indicate one or more features of a 3D avatar representation for the system 100 to generate and/or animate. The input 120 can be received from one or more user input devices that may be coupled with the system 100. The input 120 can include any of a variety of data formats, including but not limited to text, speech, audio, image, CAD data, digital asset data, and/or video data indicating instructions corresponding to the features of the 3D avatar for the system 100 to generate and/or animate. The input 120 can indicate, for example and without limitation, information regarding avatars and/or characteristics of objects to be represented by the 3D representation. In some implementations, the system 100 presents a prompt requesting the one or more attributes or features via a user interface, and receives the input 120 from the user interface. The input 120 can be received as semantic information (e.g., text, voice, speech, etc.) and/or image information (e.g., input indicative of pixels indicating regions in the scene).

Figure 2:
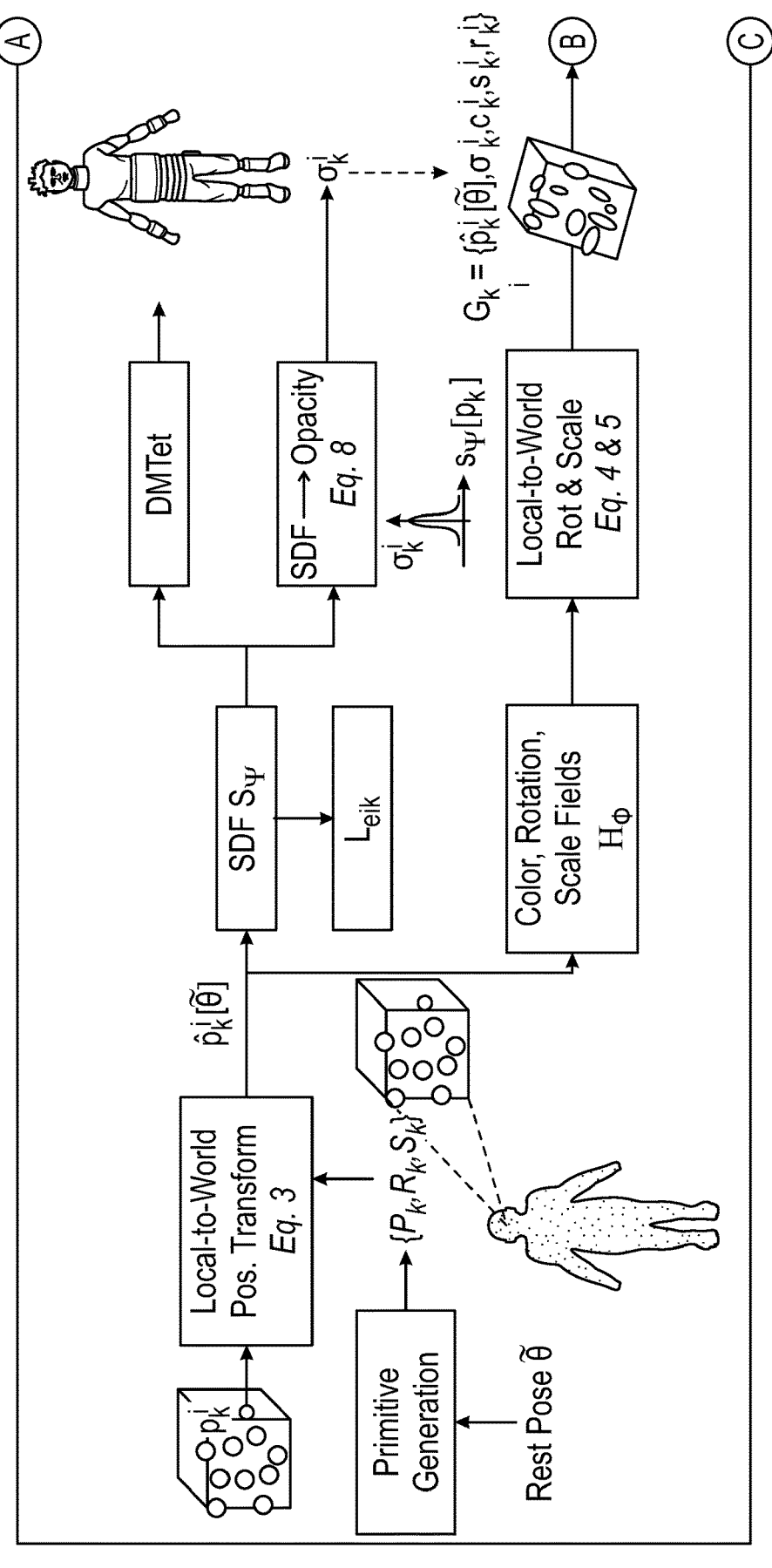
FIG. 2 is a block diagram of an example system for generating animatable objects, in accordance with some embodiments of the present disclosure.
Figure 2:
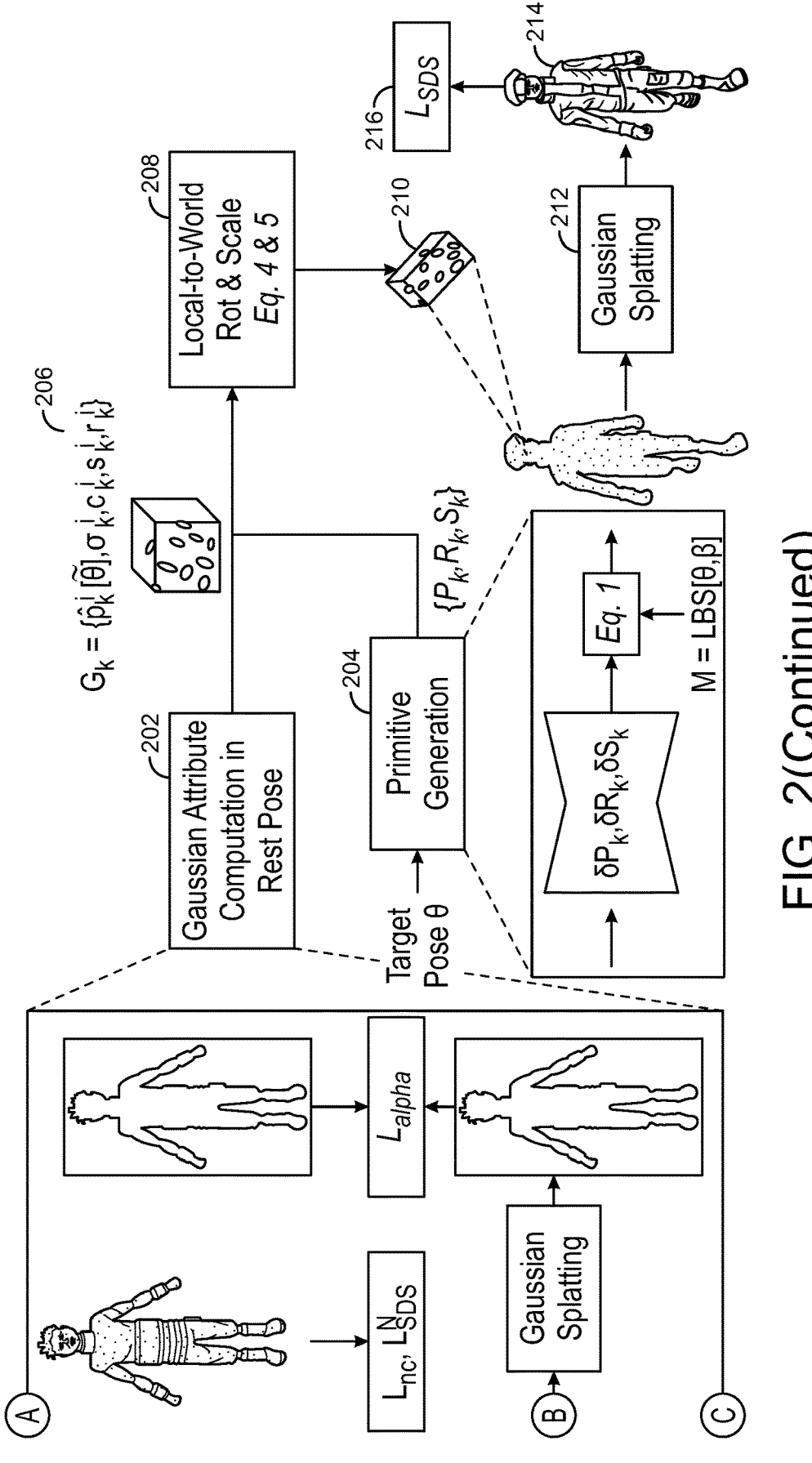

Now referring to FIG. 2, FIG. 2 depicts an example computing environment including a 3D object generation architecture 200, in accordance with some embodiments of the present disclosure. The 3D object generation architecture 200 can be used to implement the 3D Gaussian-based animatable avatar generation with high quality outputs. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The 3D object generation architecture 200 can include any function, model (e.g., machine learning model), operation, routine, logic, or instructions to perform functions such as configuring, deploying, updating, and/or generating outputs from machine learning models, including object layer models 114 and texture models 116 of FIG. 1, as described herein.

Referring to blocks 202-214 of FIG. 2 with reference to FIG. 1, a GAvatar implementation is described that generates a 3D Gaussian-based animatable avatar given a text prompt. For example, the GAvatar implementation includes a primitive-based implicit 3D Gaussian representation that is used to allows avatar animation and stabilize and amortize the learning of a large number of Gaussians using the high variance SDS loss. Additionally, the GAvatar implementation represents the underlying geometry of 3D Gaussians with an SDF that allows extracting high-quality textured meshes and regularizing the avatar's geometry.

With reference to the primitive-based implicit 3D Gaussian representation, the GAvatar implementation can leverage this framework to structure the spatial distribution and orientation of the Gaussian functions, which are intrinsically linked to the primitives attached to the avatar's mesh. This approach can ensure that each primitive adheres to the underlying geometry of the avatar, dictated by both the rest pose and the subsequent pose transformations. The use of 3D Gaussians can allow for a more granular control over the deformation of the avatar, facilitating a higher degree of freedom in animation while maintaining continuity and smoothness in the avatar's motion. The SDS loss can operate within this context to optimize the avatar's parameters, refining the model with precision that accounts for the nuanced variance introduced by the text-to-image diffusion processes.

With reference to the SDF incorporation, the precision in defining the avatar's geometry is significantly enhanced. The SDF can act as a scalar field that assigns a distance value to every point in space relative to the surface of the avatar, with the sign indicating whether the point is inside or outside the geometry. This level of geometric definition can provide the extraction of high-quality meshes. When integrated into the GAvatar implementation, the SDF can allow high-resolution mesh generation and also contributes to the regularization of the avatar's shape. By aligning the Gaussian distribution with the SDF, the models can allow the integration between the abstract mathematical representation and tangible, animate geometry, allowing the avatar's surface to be depicted accurately based on the desired text-driven animations.

Moreover, the introduction of Gaussian Splatting as a tool for 3D scene reconstruction can improve efficiency and adaptability due to its probabilistic approach to rendering, but its direct application to dynamic human (or animal) avatar or dynamic object generation introduces specific complexities (e.g., animation and training stability challenges). For example, the GAvatar implementation specifically addresses how to transform the Gaussians defined in the world coordinate system along with the deformable avatar and how to learn Gaussians with consistent attributes (e.g., color, rotation, scaling, etc.) within a local neighborhood. That is, the systems and methods described in FIG. 2 provide an improved architecture for the dynamic deformation of primitives using an approach that ensures attribute stability and spatial coherence, effectively facilitating the realistic animation of avatars within complex 3D scenes.

Gaussians accompanying the avatar's deformations calls for a framework that ensures their persistent alignment with the evolving posture, while concurrently learning Gaussian attributes that exhibit spatial consistency is paramount to avoid erratic visual artifacts. The innovation of a primitive-based implicit Gaussian representation presents a dual solution: it affords a consistent attribute distribution across the avatar's surface and provides a stable reference frame for the Gaussians, thereby upholding the model's structural coherence through the spectrum of human movement and animation.

Still referring to FIGS. 1-2, the modeler system 110 can output a 3D model of a subject through a series of operations, beginning with the assignment of a plurality of first elements—primitives—onto the surface of the subject in an initial or rest pose. These primitives can be positioned to correspond with the surface anatomy of the subject. The modeler system 110 can then assign a series of second elements—3D Gaussians—to each primitive. Each Gaussian can include an opacity value that is linked to their proximity to the subject's surface. For example, closer Gaussians are less transparent, while those further away are more transparent. For example, a signed distance function (SDF) can be used to create the transparency effect that will/can mirror the real-world observations of the subject.

Responsive to determining the primitives and their respective Gaussians for the subject in the rest pose, the modeler system 110 can proceed to update the pose. For example, informed by a target pose and attributes of the subject (e.g., texture, color, other features represented by neural fields) the modeler system 110 can update the second elements. In some implementations, the update is a targeted optimization that adjusts the Gaussians' positions, rotations, scales, and opacities, to match the new, target pose. In some implementations, the attributes for these updates can be derived from a text prompt.

Responsive to determining the primitives and Gaussians for the subject in the target pose, the modeler system 110 can render the subject. In some implementations, the modeler system 110 can sample or test the model's fidelity against a target view or text prompt that directed the pose adjustment. For example, a score distillation sampling (SDS) framework can be used to optimize the arrangement and attributes of the Gaussians. The rendered 3D subject, in combination with a mask determined from the subject's representation and an alpha rendering derived from the Gaussians, can be used by the modeler system 110 to refine the models further. Through an interactive process, the modeler system 110 can be enhanced to create accurate, high-quality renderings of subjects in various poses and appearances as specified by input prompts.

At block 202, the modeler system 110 of FIG. 1 can perform Gaussian attribute computation in a rest pose of an animatable object (e.g., animatable human avatar). First, at blocks 202 and blocks 204, the modeler system 110 can perform a primitive formulation, where the object (e.g., human body or animal body) is represented by a set of primitives attached to its surface. The transformer 112 of FIG. 1 can generate primitives $V_k$, which can each be characterized by a position ($P_k$), rotation ($R_k$), and scale ($S_k$) in a rest or target pose ($\theta$) of an object (e.g., avatar, person, animal), shown as $\{P_k, R_k, S_k\}$. A primitive-based 3D representation can represent a 3D scene by a set of primitives such as cubes, points, or nerflets. While cubic primitives are shown and described with reference to FIG. 2, points or nerflets could be used to represent the set of primitives. For example, the set of K cubic primitives $\{V_1, \ldots, V_k\}$ can be attached to the surface of a SMPL-X mesh $\mathcal{M}$=LBS ($\theta$, $\beta$), where $\theta$ and $\beta$ are the SMPL-X pose and shape parameters, and LBS is the linear blend skinning function. Each primitive $V_k=\{P_k, R_k, S_k\}$ can be defined by its location $P_k \in \mathbb{R}^3$, per-axis scale $S_k \in \mathbb{R}^3$, and orientation $R_k \in SO(3)$. The primitive parameters can be generated by (Equations 1):

$$P_k(\theta) = \hat{P}_k(\mathcal{M}) + \delta P_\omega(\theta)_k, \tag{1}$$

$$R_k(\theta) = \delta R_\omega(\theta)_k \cdot \hat{R}_k(\mathcal{M}),$$

$$S_k(\theta) = \hat{S}_k(\mathcal{M}) + \delta S_\omega(\theta)_k,$$

where the modeler system 110 can first determine (block 202) a mesh-based primitive initialization $\hat{P}_k(\mathcal{M})$, $\hat{R}_k(\mathcal{M})$, $\hat{S}_k(\mathcal{M})$, and then apply pose dependent correctives (block

13

204) $\delta P_\omega(\theta)$, $\delta R_\omega(\theta)$, $\delta S_\omega(\theta)$, which are represented by neural networks with parameters w. The mesh-based initialization can then be determined by placing the primitives on a 2D grid in the mesh's uv-texture space and generating the primitives at the 3D locations on the mesh surface points corresponding to the uv-coordinates.

Additionally, the modeler system 110 can use score distillation sampling (SDS) to perform and optimization of the parameters $\eta$ of a 3D model g using a pre trained text-to-image diffusion model. In some implementations, given a text prompt y and the noise prediction $\hat{\epsilon}$ $(I_t; y, t)$ of the diffusion model, SDS optimizes model parameters $\eta$ by minimizing the difference between the noise $\epsilon$ added to the rendered image $I=g(\eta)$ and the predicted noise $\hat{\epsilon}$ by the diffusion model:

$$\nabla_\eta \mathcal{L}_{SDS} = E_{t,\epsilon}\left[w(t)(\hat{\epsilon}(I_t; y, t) - \epsilon)\frac{\partial I}{\partial \eta}\right], \quad (2)$$

where $g(\eta)$ denotes the differentiable rendering process of the 3D model, t is the noise level, $I_t$ is the noised image, and $w(t)$ is a weighting function. In some implementations, the weight function can be designed to adjust the influence of different noise levels on the gradient computation, such that the optimization process is sensitive to certain features in the image at various stages of rendering. Furthermore, SDS optimization can refine the 3D model's parameters through interactive backpropagation to align the quality and detail of the model during training with the text prompt y.

At block 202, the mesh-based primitive initialization can serve as the reference configurations of the object without any pose-induced deformations. The initialization, denoted by $\hat{P}_k(\mathcal{M})$, $\hat{R}_k(\mathcal{M})$, $\hat{S}_k(\mathcal{M})$, correspond to a neural state of the mesh $\mathcal{M}$, where the pose $\theta$ and shape $\beta$ parameters are at their default settings (e.g., providing a base upon which further transformations are applied). Additionally, the set of cubic primitives $\{V_1, \ldots, V_k\}$ can be initially aligned with the surface of the SMPL-X mesh by placing them on a 2D grid within the mesh's UV texture space. In some implementations, UV coordinates are then used to generate the primitives at corresponding 2D locations on the mesh surface, establishing their initial positions in the rest pose.

At block 204, the pose-dependent correctives—$\delta P_\omega(\theta)$, $\delta R_\omega(\theta)$, $\delta S_\omega(\theta)$—represent the modifications needed to transform the primitive from the rest pose to a target pose. The correctives can account for the changes that occur due to the object moving from the neutral rest position to a specific, target pose. The primitive positions, orientations, and scales can be altered to conform to the new posture. For example, the primitives can be adjusted in real-time or near real-time according to the pose parameter $\theta$, using the neural networks parameterized by $\omega$ to accurately capture the object's deformed shape. Subsequently to establishing the initial position of the primitives, the neural networks can apply the pose-dependent correctives to these primitives to match the target pose, allowing the models to animate the rest position to a range of poses dictated by pose parameter $\theta$.

Following the initialization and application of pose-dependent correctives, the modeler system 110, can further refine the representation of the animatable object by determining the attributes of the Gaussians contained within each primitive. In some implementations, determining the attributes of the Gaussians can include computing the Gaussian parameters that best represent the local surface properties of the mesh at the primitives' corresponding positions. The attributes are modified to capture the object's texture normal, and curvature details. In some implementations, the attributes are computed using pose-dependent deformations applied to the primitives, leveraging the underlying SMPL-X mesh as a reference to generate a high-fidelity, animatable 3D object.

For example, within each primitive, a collection of $N_k$ 3D Gaussians can be defined by the modeler system 110, each with a specific position $$(p_k^i),$$

rotation $$(r_k^i),$$

and scale $$(s_k^i)$$

parameters established within the primitive's local coordinate framework. Since the primitives are naturally deformed according to the human (or object) pose and shape, the modeler system 110 can attach a set of 3D Gaussians $$\{G_k^1, \ldots, G_k^{N_k}\}$$

to the local coordinate system of each primitive $V_k=\{P_k, R_k, S_k\}$ and deform them along with the primitive. For example, each Gaussian $$G_k^i = \{p_k^i, r_k^i, s_k^i, c_k^i, \sigma_k^i\}$$

(e.g., Gaussians 206) can be defined by its position $$p_k^i,$$

rotation $$r_k^i,$$

and scaling $$s_k^i$$

in the primitive's local coordinates, as well as its color features $$c_k^i$$

and opacity $$\sigma_k^i.$$

As shown, Gaussians 206 depicted in a cube (primitive) with different colored, rotated, and scaled dots representing the individual 3D Gaussians within the primitive, where each Gaussian can have unique attributes that will/can contribute to the modeling of the object's surface texture and form.

Furthermore, at block 208, a local-to-world position transformation model can transition the Gaussians to their canonical positions, $$\hat{p}_k^i(\theta)$$

in world coordinates, where $$\hat{p}_k^i(\theta), \hat{s}_k^i(\theta),$$

and $$\hat{r}_k^i(\theta)$$

associated with the primitives may be defined as (Equations 3-5):

$$\hat{p}_k^i(\theta) = R_k(\theta) \cdot \left( S_k(\theta) \odot p_k^i \right) + P_k(\theta) \tag{3}$$

$$\hat{s}_k^i(\theta) = S_k(\theta) \cdot s_k^i \tag{4}$$

$$\hat{r}_k^i(\theta) = R_k(\theta) \cdot r_k^i \tag{5}$$

In some implementations, this can be achieved by applying the global transformations corresponding to the primitives, thereby transitioning the Gaussians from their local position references within each primitive to a global context that aligns with the object's overarching spatial orientation and scale. This primitive-based Gaussian representation can naturally balance constraint and flexibility. This approach can provide improvements over existing representation methods because it can provide greater flexible compared to the native primitive representation since it can allow a primitive to deform beyond a cube by equipping it with Gaussians. Accordingly, by using Gaussians, each primitive can adapt its shape with more dynamically that if it were just a rigid cube, thereby allowing more complex and nuanced deformations. Meanwhile, the Gaussians within each primitive share the motion of the primitive and are more constrained during animation. Thus, when the Gaussians are tied to their respective primitives (e.g., their movement is controlled and predictable during animations) it provides avatar animation systems a balance between flexibility and constraint.

Referring to blocks 202, 204, and 208 collectively, the process includes the transitioning of an avatar from a rest pose to a target pose based on manipulating the primitives and their contained Gaussians. The transition is guided by a text prompt that specifies the desired action or state of the object (e.g., avatar), which influences the application of pose-dependent correctives and the subsequent deformation. For example, if the text prompt describes the avatar as "waving the left hand," the modeler system 110 can interpret this to determine the necessary adjustments to the primitives and Gaussians to achieve a left hand waving from a stationary left hand.

At block 202, the initialization establishes the primitives' baseline configurations (e.g., positions, orientations, scales, opacity) on the avatar's (or object's) mesh in its rest pose (or initial pose), such that during the local-to-world rotation and scaling, the mesh's default pose and shape parameters can be used as a reference. Based on the text prompt, block 202 can ensure the avatar's initial state is neutral, allowing for a starting point for any pose transformation dictated by the prompt.

At block 204, the pose-dependent correctives—$\delta P_\omega(\theta)$, $\delta R_\omega(\theta)$, $\delta S_\omega(\theta)$—are introduced to adjust the primitives from their initial rest pose to the target pose. The adjustments can be influenced by the text prompt, where the modeler system 110 can attempt to mimic the described action or posture by altering the object's geometry accordingly. The correctives can dynamically alter the primitives' positions, orientations, and/or scales based on the avatar's pose parameter $\theta$, thereby accommodating the specific, target pose-induced deformations.

At block 208, the local-to-world transformation model takes the output from both blocks 202 (the rest pose primitives) and block 204 (the target pose primitives) to perform a deformation of the primitives. For example, the transformation can align the avatar's pose with the text prompt's specifications, attempting to accurately reflect the desired action or emotional state of the avatar (or object). For example, the modeler system 110 can apply global transformations to the primitives, transitioning the Gaussians from their local coordinates within each primitive to a global context that reflects the avatar's overall spatial orientation and can scale in the target pose. Equations 3-5 for $$\hat{p}_k^i(\theta), \hat{s}_k^i(\theta), \text{ and } \hat{r}_k^i(\theta)$$

distill how each Gaussian's position, scale, and rotation are adapted to the target pose, maintaining a representation of the avatar as it transitions from rest to the target pose.

The local-to-world transformation at block 208 generates an output that includes a plurality of deformed primitives, no longer restricted to cubic forms, adjusted with their corresponding Gaussians 210 (colored, rotated, and scaled dots within the primitive). The adapted primitives that are each contoured to match the avatar's dynamically posed structure are shown on the avatar's surface. For example, the avatar's surface can be deformed to capture the specified action, emotional state, clothing, and/or objects as derived from the text prompt.

The Gaussian splatting at block 212 includes the modeler system 110 using the updated positions and attributes of the Gaussians from the object layer models 114 and texture models 116 to render the avatar's visual representation. The modeler system 110 can project each Gaussian's color and opacity onto the image plane (RGB image I) to synthesize the final composite image. For example, the splatting utilizes the transformed Gaussian parameters $$\hat{p}_k^i(\theta), \hat{s}_k^i(\theta),$$

and $$\hat{r}_k^i(\theta),$$

and the opacity values $$\sigma_k^i$$

derived from the SDF values calculated at block 208. The renderer 118 of modeler system 110 can execute a splatting algorithm that aggregates the contributions of the individual Gaussians to form an interconnected and continuous visual field, which results in object 214 that embodies the target pose with articulated motion and surface details. In some implementations, at block 216, the visual output from the Gaussian splatting can be subsequently used to compute the SDS loss $L_{SDS}$, allowing the modeler system 110 to refine the Gaussian attributes for constituency and alignment with the target appearance and pose.

Furthermore, after obtaining the positions and attributes of 3D Gaussians, the renderer 118 can perform Gaussian splatting to render an RGB image I and also an alpha image $I_\alpha$. For example, the RGB image captures the color information as projected from the Gaussians, while the alpha image represents the transparency information, indicating how the visual elements of each Gaussian should blend with the background and with each other. Furthermore, the alpha image will/can directly affect the visual realism by allowing soft transitions and nuanced visibility between the foreground avatar (or object) and its environment. The RGB image I can then be used for the SDS loss defined in Equation 2 a training objective. To prevent the Gaussians from straying far away from the primitives, the renderer 118 also utilizes a local position regularization loss $$\mathcal{L}_{pos} = \sum_{k,i} \|p_k^i\|^2,$$

which constrains the Gaussians to be close to the origin of the associated primitives.

The representation generation by the Gaussian splatting combines the surface mesh details with a mixture of volumetric primitives, thereby laying a structural foundation that is technologically proficient at capturing a wide spectrum of shapes, including those that diverge from template meshes like SMPL-X. This hybrid approach mitigates disparities between the coarse resolution offered by volumetric primitives and the high-fidelity surface details necessitated by complex animations and poses. While the mesh provides a detailed outline and the overall structure of the avatar, the volumetric primitives introduce flexibility in representing broader shape variations beyond the constraints of pre-defined models. Concurrently, Gaussians can be used to detail the finer distinctions that exceed the primitive resolution, such as subtle facial expressions, intricate clothing textures, or dynamic hair movements. This layer of detail can ensure that the final rendered avatar (or object) adheres to the desired pose with precision and represents a level of detail and realism that is often unattainable with traditional modeling techniques alone. Through this combinational representation, the modeler system 110 can render avatars that present diverse and complex shapes with an improved level of detail, thereby improving the overall visual quality and realism of the animated characters.

Referring to the texture models 116 of FIG. 1 in greater detail, the texture models 116 can produce an output of a prediction of color, rotation, and can scale fields of the object. For example, the positions of the Gaussians $$\hat{p}_k^i(\theta)$$

can be used to query the color $$c_k^i,$$

rotation $$r_k^i,$$

and scaling $$s_k^i$$

of each Gaussian from a neural attribute field $\mathcal{H}_\Phi$. For example, to fully exploit the expressiveness of 3D Gaussians, the texture models 116 can be used to allow each Gaussian to have individual attributes, e.g., color features, scaling, rotation, and opacity. However, this could potentially result in unstable training where Gaussians within a local neighborhood possess very different attributes, leading to noisy geometry and rendering. This is especially true when the gradient of the optimization objective has high variance, such as the SDS objective in Equation 2. To stabilize and amortize the training process, instead of directly optimizing the attributes of the Gaussians, the texture models 116 can be implemented to predict these attributes using neural implicit fields. As shown, for each Gaussian $$G_k^i,$$

the modeler system 110 can first compute the canonical position $$\hat{p}_k^i(\bar{\theta})$$

in the world coordinate system in Equation 3, where $\bar{\theta}$ represents the rest pose. Then the texture models 116 can then query the color $$c_k^i,$$

rotation $$r_k^j,$$

scaling $$s_k^i$$

and opacity $$\sigma_k^i,$$

of each Gaussian using the canonical position $$\hat{p}_k^i(\hat{\theta})$$

from two neural implicit fields $\mathcal{H}_\Phi$, and $\mathcal{O}_\psi$, which can be represented by neural networks with parameters $\Phi$ and $\psi$:

$$\left(c_k^i, r_k^i, s_k^i\right) = \mathcal{H}_\Phi\left(\hat{p}_k^i(\hat{\theta})\right) \qquad (6)$$

$$\sigma_k^i = \mathcal{O}_\psi\left(\hat{p}_k^i(\hat{\theta})\right) \qquad (7)$$

where the texture models 116 can use a separate neural field $\mathcal{O}_\psi$, to output the opacities of the Gaussians, while other attributes are predicted by $\mathcal{H}_\Phi$. The design of separate neural fields is because the opacities of the Gaussians are closely related to the underlying geometry of the avatar and compel special treatment. By querying the neural field with a canonical rest pose $\hat{\theta}$, the texture models 116 can canonicalize the Gaussian attributes, which can then be shared across different poses and animations. The texture models 116 use of neural implicit fields can constrain nearby Gaussians to have consistent attributes, which stabilizes and amortizes the training process and allows high-quality avatar synthesis using high-variance losses. In some implementations, the implicit fields can be regularized to promote smooth transitions in attributes across the surface of the object, thus mitigating abrupt changes and providing that neighboring Gaussians have attributes that vary gradually.

In expanding the capabilities of the texture models 116, the modeler system 110 can use the implicitly Gaussian attribute field $\mathcal{H}_\Phi$, to provide texture extraction that improves the fidelity of the final avatar rendering. For example, by querying the Gaussian color field, the modeler system 110 extracts a high-quality 3D texture that can be applied directly to the differentiable rasterization process of mesh $\tilde{\mathcal{M}}$. The inherent color attributes of the Gaussians can provide an initial texturing that captures the avatar's nuanced appearances. The texturing can be subsequently refined through fine-tuning iterations of the color fields by using an SDS loss $$\mathcal{L}_{sds}^{\tilde{M}}$$

on the RGB rendering $I_{\tilde{\mathcal{M}}}$ of the textured mesh, thereby sharpening the textural details and aligning the visual output with the geometric precision of the avatar's form.

Utilizing neural implicit fields within the texture models 116 can provide improvements by implicitly enforcing spatial coherence among the attributes of adjacent Gaussians. This provides a technological improvement because it addresses the issue of inter-Gaussian dependency, ensuring that neighboring Gaussians exhibit similar properties. By not feeding each Gaussian independently—which would allow them to move without regard to their neighbors—the texture models 116 promote a degree of interdependence that results in smoother transitions and more uniform properties across the surface of the avatar. Such a cohesive approach improves the training stability, as it mitigates the risks associated with high-variance gradients that can arise during the optimization of complex models. Moreover, this method facilitates an improved and reliable synthesis of high-quality avatars, as the resulting consistency in attributes across Gaussians provides more realistic and visually pleasing animations. The attributes predicted by the neural fields, therefore, maintain the structural and visual integrity of the avatar throughout a wide array of poses and movements.

Referring to the object layer models 114 of FIG. 1 in greater detail, the object layer models 114 can output a signed-distance field (SDF) representing the underlying geometry of the object—the outer layer of the object— where the SDF is a distance value to the surface of the object for every point in 3D space. For example, each Gaussian's SDF value can be queried from a neural SDF $S_\psi$ and can be converted into the opacity $$\sigma_k^i$$

through a kernel function $\mathcal{K}$. A neural network of object layer models 114 can be trained to represent the underlying geometry of 3D Gaussians through a signed distance field (SDF) function $S_\psi$ with parameters $\psi$. For example, the object layer model 114 can parametrize the opacity $$\sigma_k^i$$

of each 3D Gaussian based on their signed distance to the surface using a kernel function (Equation 8):

$$\sigma_k^i = \mathcal{K}\left(S_\psi\left(p_k^i\right)\right), \qquad (8)$$

where $\mathcal{K}(x) = \gamma e^{-\lambda x}/(1+e^{-\lambda x})^2$ is a bell-shaped kernel function with learnable parameters $\{\gamma, \lambda\}$ that maps the signed distance to an opacity value. The opacity parametrization builds in the prior Gaussians that should remain close to the surface in order to obtain high opacity. The parameter $\lambda$ controls the tightness of the high opacity neighborhood of the surface and $\alpha$ controls the overall scale of the opacity. The SDF-based Gaussian opacity parametrization fits the primitive-based implicit Gaussian representation, since now object layer models 114 can define the aforementioned opacity field $\mathcal{O}_\psi$ as the product of the SDF and the kernel function: $\mathcal{O}_\psi = \mathcal{K} \circ S_\psi$, where a neural network can be used to directly represent the SDF $S_\psi$.

Additionally, since the neural network uses an SDF $S_\psi$ to represent the underlying geometry of 3D Gaussians, the object layer models 114 can extract a mesh $\widetilde{M}$ from the SDF through differentiable marching tetrahedra (DMTet) (Equation 9):

$$\widetilde{M} = DMTet(S_\psi, \mathcal{K}) \tag{9}$$

where $\mathcal{K}$ is a learnable parameter denoting the level set used to extract mesh from the SDF $S_\psi$. For example, $\mathcal{K}$ can be (used as) a learnable offset of the SDF. The neural network may not use a 0-level set since the Gaussians may not have the highest opacity values to achieve the desired rendering. In some implementations, the level set $\mathcal{K}$ is tuned during training to fine-tune the threshold at which the mesh $\widetilde{M}$ is extracted from the SDF $S_\psi$, allowing for the manipulation of the mesh's resolution and the detail it captures from the underlying SDF representation. For example, a higher value for $\mathcal{K}$ could result in a mesh that includes more of the finer details present in the SDF, whereas a lower value could simply the mesh, focusing on the larger, more significant geometrical features of the avatar.

The DMTet approach can synthesize high-resolution 3D shapes from simple inputs like coarse voxels by employing a hybrid 3D representation that combines implicit and explicit forms. Unlike traditional implicit methods focused on regressing signed distance values, DMTet optimizes directly for the reconstructed surface, enabling the synthesis of finer geometric details with reduced artifacts. In some implementations, the model uses a deformable tetrahedral grid to encode a discretized signed distance function, with a differentiable marching tetrahedra layer that converts the implicit distance representation into an explicit surface mesh. This allows joint optimization of surface geometry and topology, along with the generation of a hierarchy of subdivisions through reconstruction and adversarial losses defined on the surface mesh.

Using the DMTet method, the neural network's use of an SDF $S_\psi$ for 3D Gaussian geometry allows for the modeler system 110 to extract the avatar mesh $\widetilde{M}$ by applying the DMTet process. For example, the extraction can be controlled through the adjustment of the level set parameter $\mathcal{K}$, which optimizes the balance between capturing detailed geometric features and maintaining computational efficiency. As shown, the DMTet process can create three avatar layers: (1) the object, (2) the mesh, and (3) a set of gaussians defined with respect to the primitive, shown as a rest pose of the object. For example, the object layer provides a course outline, the mesh layer adds detailed surface geometry, and the Gaussian layer imparts finer texture and shape details through the individual attributes.

Additionally, Gaussians are often used in the creation of videos and simple visual effects, where speed and computational efficiency is prioritized over high fidelity (hi-fi) required for 3D assets generation. This application has been largely due to the inherent limitations in representing complex, dynamic 3D shapes and textures with sufficient detail and accuracy. However, the disclosed GAvatar implementation provides significant technological advancement in this domain. By integrating Gaussian representations with modeling techniques such as signed distance fields (SDFs), differentiable marching tetrahedra (DMTet), and neural implicit fields, the modeler system 110 expands the use cases of Gaussians. It allows the creation of high-fidelity 3D avatars that can be animated and transformed across a wide range of poses and expressions with increased detail and realism. The GAvatar implementation improves the expressiveness and dynamic range of the 3D models and addresses the challenge of inter-Gaussian dependency, providing a cohesive and consistent visual output that aligns with the complex requirements of modern digital environments. Accordingly, the GAvatar implementation provides an improved technological solution that expands the potential of Gaussian-based modeling, setting a new standard for the generation of detailed and realistic 3D assets.

Both the SDF and extracted mesh can allow the object layer model 114 to utilize various losses to regularize the geometry of the 3D Gaussian avatar (or another 3D Gaussian object). For example, an Eikonal regularizer can be employed to maintain a proper SDF, which is defined as (Equation 10):

$$\mathcal{L}_{eik} = (\| \nabla_p S_\psi(p) \| - 1)^2, \tag{10}$$

where $p \in P$ contains both the center points of all Gaussians in the world coordinates as well as points sampled around the Gaussians using a normal distribution. In some implementations, the Eikonal regularizer helps to ensure that the SDF maintains a unit gradient outside of the object's surface, which is important for accurate representation of the distance field and subsequent geometry extraction. For example, during backpropagation, the regularizer adjusts the network parameters $\psi$ to correct any deviations from the unit gradient condition.

Additionally, the object layer models 114 can employ an alpha loss to match the mask $I_M$ rendered using the extracted mesh to the alpha image $I_\alpha$ from the Gaussian splatting (Equation 11):

$$\mathcal{L}_{alpha} = \| I_M - I_\alpha \|^2. \tag{11}$$

where $\mathcal{L}_{alpha}$ quantifies the discrepancy between the mask image $I_M$ generated by the extracted mesh and the alpha image $I_\alpha$ resulting from Gaussian splatting. Since the transparency of the Gaussians allows for rendering of nuanced visual features, the alpha loss facilies the alignment of these renderings with the mesh silhouette, providing confirmation of visual consistency. For example, the comparison ensures the geometry captured by the Gaussian rendering closely mirrors the extracted mesh, providing a supervisory signal for geometric fidelity within the model's learning architecture.

Additionally, a normal SDS loss can be determined to supervise the normal rendering $I_N$ of the extracted mesh using differentiable rasterization. The SDS gradient can be computed as (Equation 12):

$$\nabla_\theta \mathcal{L}_{SDS}^N = E_{t,\epsilon}\left[w(t)(\hat{\epsilon}(I_{N,t}; y, t) - \epsilon)\frac{\partial I_N}{\partial \theta}\right], \tag{12}$$

where $I_{N,t}$ is the noised normal image. In some implementations, the noised normal image $I_{N,t}$ is used to train the object layer models 114 against potential perturbations, thereby enhancing the stability of the normal estimation. For example, the model might introduce synthetic noise during training to simulate real-world imperfections in the data. For example, SDS normal loss $$\mathcal{L}_{SDS}^N$$

aids in supervising the SDF neural network by ensuring that the normal map, which can be used as input to a diffusion model.

In some implementations, a normal consistency loss $\mathcal{L}_{nc}$ which regularizes the difference between the adjacent vertex normals of mesh $\tilde{\mathcal{M}}$ can be used. In some implementations, the normal consistency enforces smoothness in the resulting mesh by penalizing discrepancies between the normals of adjacent vertices. For example, when reconstructing avatars (e.g., organic or new) the $\mathcal{L}_{nc}$ could be used to enforce smooth transitions between surface elements to maintain a realistic appearance.

Additionally, a reconstruction loss $\mathcal{L}_{recon}$ can be used. For example, the $\mathcal{L}_{recon}$ can assist the object layer models 114 and texture models 116 in refining the avatar's likeness to a given real-world image. $\mathcal{L}_{recon}$ would operate by comparing the generated avatar image against a provided reference image (e.g., photograph of a person, and minimizing the differences in appearance, especially in terms of the pose and visual texture. The $\mathcal{L}_{recon}$ can be used to ensure that the output from the renderer 118, which includes visual details such as shadows, highlights, and contours, aligns with those of the reference image. In some implementations, the use of $\mathcal{L}_{recon}$ can allow for the assessment of consistency between the reference and the rendered images from multiple viewpoints, offering a multi-dimensional evaluation of the model's accuracy. For example, by using multi-view consistency, the modeler system 110 can verify that the visual representation of the avatar is coherent when observed from various angle.

Referring to block 202—Gaussian attribute computation in rest pose—in greater detail, the modeler system 110 initiates the process of creating a 3D representation of an animatable object, like a human avatar, starting from a rest pose. This rest pose is a baseline for the object's geometry, devoid of any deformations caused by movements or actions. The transformer 112 of FIG. 1 can generate a series of primitives (e.g., geometric shapes that approximate the object's form). These primitives are placed onto the object's mesh surface, aligning with its underlying structure. The rest pose's primitives can be defined by the transformer 112 with parameters for their position, rotation, and scale (as denoted by $\{P_k, R_k, S_k\}$) using the avatar's mesh, which is in a neutral, undeformed state.

Responsive to these primitives being established and Gaussians have been generated, the local-to-world position transformation is applied by transformer 112, for instance as defined by Equation 3. For example, the transformation can take as input the localized position of each Gaussian $$p_k^i$$

within the primitive's coordinate system, and the primitive's parameters $\{P_k, R_k, S_k\}$, and converts them into a global position $$\hat{p}_k^i(\theta)$$

in the world coordinate system.

In some implementations, the transformed primitives' positions become inputs for both the object layer models 114 and the texture models 116. The object layer models 114 can use the transformed positions to create an SDF, which is a representation of the avatar's geometry. The SDF assigns a distance value to every point in space in relation to the avatar's surface. The object layer models 114 then can apply a differentiable marching tetrahedra (DMTet) algorithm to the SDF, converting it into a mesh—the avatar's geometric form that can be rendered visually. During this mesh generation process, normal consistency loss $\mathcal{L}_{nc}$ and SDS normal loss $$\mathcal{L}_{SDS}^{N}$$

can be computed to ensure that the geometry of the mesh is smooth and accurately reflects the avatar's shape. For example, the losses can be used to regularize the mesh generation process, aligning it closely with the surface details defined by the SDF.

Simultaneously, the texture models 116 can use the same transformed primitive positions to assign color, rotation, scaling, and opacity attributes to each Gaussian within the primitives. The opacity is particularly influenced by the SDF's data and is computed using Equation 8:

$$\sigma_k^i = \mathcal{K}(S_\psi(p_k^i)),$$

where $\mathcal{K}$ is a kernel function transforming the SDF's signed distance values into opacity values for the Gaussians. This relationship ties the visual appearance of the avatar (its texture and form) closely to its geometric representation generated by the SDF. After the texture models 116 define the attributes of each Gaussian, including their color and opacity, the Gaussians can undergo Gaussian splatting, a process where these attributes are used to render a visual representation of the avatar (e.g., shown against a contrasting background), resulting in an image where the avatar is highlighted (e.g., shown as white against a black background).

Referring to block 204—target pose generation—in greater detail, the modeler system 110 can receive a target pose and determine pose-dependent correctives. For example, the correctives are modifications to the primitive parameters that will/can allow the avatar to move from its initial neutral, rest pose to the desired target pose specified by the user or system. In some implementations, the modeler system 110 accounts for the current pose and shape parameters $(\theta, \beta)$ of the avatar through the Linear Blend Skinning (LBS) function $\mathcal{M} = \text{LBS}(\theta, \beta)$. The pose-dependent correctives—$\delta P_\omega(\theta)$, $\delta R_\omega(\theta)$, $\delta S_\omega(\theta)$—are applied to the mesh-based primitive initialization from block 202, and the updated primitive parameters obtained by Equation 1. These updated parameters represent the new positions, orientations, and scales of the primitives conforming to the target pose. Responsive to the primitives having been adjusted for the target pose, the next step involves combining this information with the Gaussians' attributes computed at block 202. Each Gaussian $$G_k^i (206)$$

defined by its position, rotation, scaling, color features, and opacity—

$$\{p_k^i, r_k^i, s_k^i, c_k^i, \sigma_k^i\}$$

—is transformed according to the new primitives configurations by applying the local-to-world transformations described in Equation 4

$$\left(\hat{s}_k^i(\theta) = S_k(\theta) \cdot s_k^i\right)$$

and Equation 5

$$\left(\hat{r}_k^i(\theta) = R_k(\theta) \cdot r_k^i\right),$$

at block 208. For example, the equations can adjust the Gaussians to the transformed primitives' scale and rotation.

In some implementations, the object layer models 114 and texture models 116 are used in both the transition from the rest to the target pose and in the final rendering of the avatar. After the local-to-world transformation is applied to the Gaussians (at block 208), the object layer models 114 compute the Signed Distance Field (SDF) values for each Gaussian. The SDF gives a measure of how far a point is from the surface of the avatar, with the sign indicating whether the point is inside or outside the avatar. Using these SDF values, the object layer models can perform differentiable marching tetrahedra (DMTet) to generate a mesh $\tilde{M}$. For example, the mesh is a 3D geometric representation of the avatar in the target pose. The SDF can also be used to determine the opacity of the Gaussians through Equation 8

$$\left(\sigma_k^i = \mathcal{K}\left(S_\psi\left(p_k^i\right)\right)\right),$$

with the opacity being higher for Gaussians closer to the surface and lower for those further away.

In parallel (or sequentially), the texture models 116 can utilize the positions of the Gaussians in the world coordinate system to predict their visual attributes, such as color and opacity. For example, this can be completed using neural implicit fields, which are functions parameterized by neural networks that map the position of each Gaussian to its visual attributes. In this example, the neural implicit fields would ensure that the attributes are smoothly varied and consistent across the avatar's surface.

Accordingly, in the target pose generation, both the object layer models 114 and the texture models 116 are used to produce an accurate and detailed avatar that can move realistically. The object layer models 114 provides geometric integrity and motion of the avatar, while the texture models 116 provide visual realism by defining the appearance of the avatar's surface. The output from the models is then used for Gaussian splatting at block 212, which renders the avatar in the target pose with the desired visual attributes, resulting in object 214. In some implementations, the rendering process can be iteratively refined by computing the SDS loss $\mathcal{L}_{SDC}$ (at block 216) to ensure that the visual output aligns with the desired target pose as specified by the user or system input.

In the optimization stage, the modeler system 110 can optimize the process of constructing a digital avatar by optimizing several model components and parameters simultaneously. The total loss function $\mathcal{L}$ can be defined as (Equation 13):

$$\mathcal{L} = \mathcal{L}_{SDS} + \mathcal{L}_{pos} + \mathcal{L}_{eik} + \mathcal{L}_{alpha} + \mathcal{L}_{SDS}^N + \mathcal{L}_{nc} \qquad (13)$$

where term in the function relates to a specific purpose (noting weighting terms are omitted for brevity): $\mathcal{L}_{SDS}$ adjusts the score distillation; $\mathcal{L}_{pos}$ regularizes the positions of the Gaussians to stay close to their respective primitives; $\mathcal{L}_{eik}$ maintains an SDF with a unit gradient; $\mathcal{L}_{alpha}$ provides that the rendered image matches the expected transparency;

$$\mathcal{L}_{SDS}^N$$

optimizes the normal images; and $\mathcal{L}_{nc}$ preserves the smoothness of mesh normals. Using this objective, the modeler system 110 simultaneously optimize the Gaussian local positions $$p_k^i,$$

the parameters of the Gaussian attribute field $\mathcal{H}_\Phi$, the SDF $S_\psi$, and its associated opacity kernel parameters $\gamma$, $\lambda$, the corrective networks for primitive motion $\delta P_\omega$, $\delta R_\omega$, $\delta S_\omega$, and the SMPL-X shape parameters $\beta$. In some implementations, the object later model 114 can refine the SDF $S_\psi$, while the texture model 116 can adjust the Gaussian attribute field $\mathcal{H}_\Phi$. Together the models can update the Gaussian local positions $$p_k^i,$$

the SDF and opacity kernel parameters $\gamma$, $\lambda$, the corrective networks for primitive motion $P_\omega$, $\delta R_\omega$, $\delta S_\omega$, and the SMPL-X shape parameters $\beta$.

For example, the initialization can be a preparatory phase where the avatar's uv-map is segmented into a 64×64 grid, resulting in 4096 primitive areas. To each of these primitives, $V_k$, a set of 512 Gaussians are allocated. The local positions $$\{p_k^i\}$$

of the Gaussians can be initialized within each primitive using a uniformly distributed 8×8×8 grid. The structure placements provides a starting configuration for subsequent refinements through the optimization process.

In some implementations, training includes iterative adjustments to the model with a procedure known as Gaussian densification, which can occur every 100 iterations to accommodate the varying requirements of the avatar's complexity during animation. To render the RGB image I for the SDS loss $\mathcal{L}_{sds}$, the modeler system 110 can determine or identify the target pose $\theta$ from two sources: (1) a natural pose $\theta_N$ optimized together with the aforementioned variables; (2) a random pose $\theta_A$ sampled from an animation database to ensure realistic animation. Both the object layer model 114 and the texture model 116 can contribute to the realistic avatar animation.

In some implementations, the total loss function $\mathcal{L}$ Equation 13 can include a reconstruction loss, denoted as $\mathcal{L}_{recon}$ to improve the fidelity of the avatar generation. For example, $\mathcal{L}_{recon}$ can be incorporation into the optimization cycle to minimize discrepancies between the generated avatar view and the actual image view. Furthermore, a multi-view reconstruction could be implemented to allow the modeler system 110 to derive a more robust representation of the avatar. By employing another model trained to synthesize multi-view images from a single input image or text, the modeler system 110 can use $\mathcal{L}_{recon}$ across various perspectives (e.g., front, back, left side, right side, top down). The multi-view training can reinforce the avatar's spatial and visual accuracy, providing a detailed set of constraints that guide the avatar's 3D model towards a more precise and consistent reconstruction of the user's image across different angles.

Now referring to FIG. 3, each block of method 300, described herein, includes a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the systems and architectures of FIG. 1 and FIG. 2. However, this method may additionally or alternatively be executed by any one system, or any combination of systems, including, but not limited to, those described herein.

FIG. 3 is a flow diagram showing a method 300 for generating realistic animatable avatars from textual descriptions, in accordance with some embodiments of the present disclosure. Various operations of the method 300 can be implemented by the same or different devices or entities at various points in time. For example, one or more first devices may implement operations relating to configuring machine learning models, one or more second devices may implement operations relating to rendering, and one or more third devices may implement operations relating to receive user inputs. The one or more third devices may maintain the neural network models, or may access the neural network models using, for example and without limitation, APIs provided by the one or more first devices and/or the one or more second devices.

The method 300, at block 310, includes assigning first elements of a three-dimensional (3D) model of a subject to locations on a surface. For example, one or more processing circuits can assign a plurality of first elements of a 3D model of a subject to a plurality of locations on a surface of the subject in an initial pose. The first elements can be primitives assigned to the subject or object (e.g., human body's surface) and the initial pose can be the rest pose. In some implementations, the primitives (e.g., first elements) can include (1) a location parameter corresponding to the location of the plurality of locations to which the at least one element is assigned, (2) a scale parameter indicative of a scale of the at least one first element in a 3D frame of reference in which the subject is positioned, and (3) an orientation parameter indicative of an orientation of the subject relative to the 3D frame of reference.

In some implementations, the assignment of primitives as first elements to the subject's surface in its initial pose serves as the framework for subsequent transformations. These primitives are geometrically congruent with the natural contours of the subject, providing a base structure from which detailed modeling and animation can proceed. For example, the primitives could be cubes or other polyhedral elements whose dimensions and orientations are adjusted to align with the anatomical features of the subject. In some implementations, an input from a user or system can be used to design the avatar. For example, the processing circuits can receive an indication of the one or more attributes of the subject as at least one of text data, speech data, audio data, image data, or video data. For example, the processing circuits can interpret a textual input describing the desired pose or appearance and convert this into specific modeling parameters that define the avatar's posture and aesthetics. In another example, an uploaded image or video can serve as a reference for the subject's attributes, with the processing circuits extracting key features and translating them into modeling parameters that guide the placement and configuration of the primitives.

The method 300, at block 320, includes assigning second elements to the first elements, at least one second element having an opacity corresponding to a distance. For example, the one or more processing circuits can assign a plurality of second elements to the plurality of first elements, each second element of the plurality of second elements having an opacity corresponding to a distance between the second element and the surface of the subject. The second elements can be the 3D Gaussians that are assigned to each primitive. Additionally, the opacity can correspond to a signed distance function to solve the Gaussian transparency. For example, the opacity of the 3D Gaussians can reflect the closeness to the subject's surface, which leverages the properties of the SDF to dynamically adjust the visibility of each Gaussian based on its spatial relationship to the avatar.

In some implementations, determining the opacity of each second element of the plurality of second elements can include using a signed distance function (SDF) to represent the distance between the second element and the surface of the subject. The SDF can be used to represent geometry of 3D Gaussians by calculating the minimum distance from any point in space to the closest surface point. In some implementations, at least one second element of the plurality of second elements includes a 3D Gaussian splatting defined in a local frame of reference of a corresponding at least one first element of the plurality of first elements. For example, Gaussian splatting within the local frame of reference of the primitives provides control over the distribution and blending of these details, ensuring that each Gaussian contributes optimally to the overall appearance of the avatar. For example, the processing circuits can utilize this to simulate intricate textures like fabric, hair, or skin, where varying degrees of transparency and color are crucial for realism.

The method 300, at block 330, includes updating second elements based at least on a target pose for the subject and one or more attributes of the subject. For example, the one or more processing circuits can update the plurality of second elements based at least on a target pose for the subject and one or more attributes of the subject to determine a plurality of updated second elements. In some implementations, the model can be updated and/or optimizes with respect to the target view (e.g., an animation from the rest pose). In some implementations, the one or more attributes can be represented by neural fields.

The update of the second elements can be based at least on evaluation of one or more objective functions and the representation of the subject. For example, the SDS loss is used to match the rendered image with the target appearance, guiding the optimization of Gaussian positions and attributes for consistent visual output. For example, the processing circuits can iteratively refine the Gaussian parameters to ensure that the avatar's appearance in various poses is consistent with the inputs. In some implementations, an Eikonal regulation can be used to regularize the plurality of second elements based at least on position data of each second element of the plurality of second elements. For example, the regularization can assist in preserving the geometric accuracy of the avatar by preventing abrupt changes in the SDF, which represents the avatar's surface. For example, adjustments to the SDF parameters might be made based on the positional data of the Gaussians.

Additionally, in some implementations, an alpha loss can be used for optimizing the 3D gaussians by that includes updating the plurality of updated second elements based at least on a mask determined from the representation of the subject and an alpha rendering determined from the plurality of updated second elements. This includes updating the plurality of updated second elements based at least on a mask determined from the representation of the subject and an alpha rendering determined from the plurality of updated second elements. Furthermore, this process can include comparing the generated image's alpha values against a target alpha map to confirm that the opacity levels of the Gaussians accurately reflect the visual depth and layering in the scene. For example, fine-tuning the opacity values can be conducted to achieve a natural-looking overlap between the avatar and its background, or between different parts of the avatar itself.

The method 300, at block 340, includes rendering a representation of the subject based on the updated second elements. For example, the one or more processing circuits can render a representation of the subject based at least on the plurality of updated second elements. In some implementations, the rendered image is generated from the 3D model responsive to the primitive and Gaussians being configured and optimized. For example, the rendering of the representation can be a generated textured mesh of the subject. For example, a generated textured mesh can be a 3D model that combines geometric vertices, edges, and faces with surface textures, attempting to represent the visual appearance and physical structure of an object or character. These textures include color maps, normal maps, and specular maps that simulate real-world surfaces. In some implementations, the rendering process can include shading techniques and light simulations to enhance the realism of the textured mesh. For example, ambient occlusion, shadow mapping, and reflection models can be applied to the 3D avatar to mimic real-world lighting conditions and interactions with the environment. Furthermore, in some implementations, rendering involves the use of ray tracing to achieve realistic lighting effects, where rays of light are simulated as they bounce off surfaces, creating natural shadows and reflections.

In some implementations, the processing circuits include at least one of a system for generating synthetic data, a system for performing simulation operations, a system for performing collaborative content creation for 3D assets, a system for performing conversational AI operations, a system including one or more large language models (LLMs), a system including one or more visual language models (VLMs), a system for performing digital twin operations, a system for performing light transport simulation, a system for performing deep learning operations, a system implemented using an edge device, a system implemented using a robot, a control system for an autonomous or semi-autonomous machine, a perception system for an autonomous or semi-autonomous machine, a system incorporating one or more virtual machines (VMs), a system implemented at least partially in a data center, or a system implemented at least partially using cloud computing resources.

It should be understood that method 300 provides various improvements over existing systems. One improvement includes, since the processing circuits no longer needs to query the Gaussian attributes from the implicit fields after optimization, method 300 achieves extremely fast rendering speed due to the use of 3D Gaussians. For example, a generated avatar with 2.5 million Gaussians can be rendered with 1024×1024 resolution at 100 fps, which is significantly faster than NeRF-based approaches. Moreover, the Gaussian rendering only takes about 3 ms (300+ fps), so further speedup is possible by optimizing the speed of non-rendering operations such as LBS and primitive transforms.

Another improvement includes leveraging Gaussian Splatting to generate realistic animatable avatars from textual descriptions. As described herein, method 300 introduces a primitive-based 3D Gaussian representation that defines 3D Gaussians inside pose-driven primitives. This representation naturally supports animation and allows flexible modeling of fine avatar geometry and appearance by deforming both the Gaussians and the primitives.

Another improvement includes using the implicit Gaussian attribute fields to predict the Gaussian attributes, which stabilizes and amortizes the learning of a large number of Gaussians, and allows the processing circuits to generate high-quality avatars using high-variance optimization objectives such as SDS. Additionally, after avatar optimization, since the processing circuits can obtain the Gaussian attributes directly and can skip querying the attribute fields, method 300 achieves extremely fast (100 fps) rendering of neural avatars at a resolution of 1024×1024. This is significantly faster than existing NeRF-based avatar models that query neural field for each novel camera view and avatar pose.

Another improvement includes implementing a novel signed distance function (SDF)-based implicit mesh learning approach that connects SDF with Gaussian opacities. For example, it allows the processing circuits to regularize the underlying geometry of the Gaussian avatar and extract high-quality textured meshes.

Figure 4:
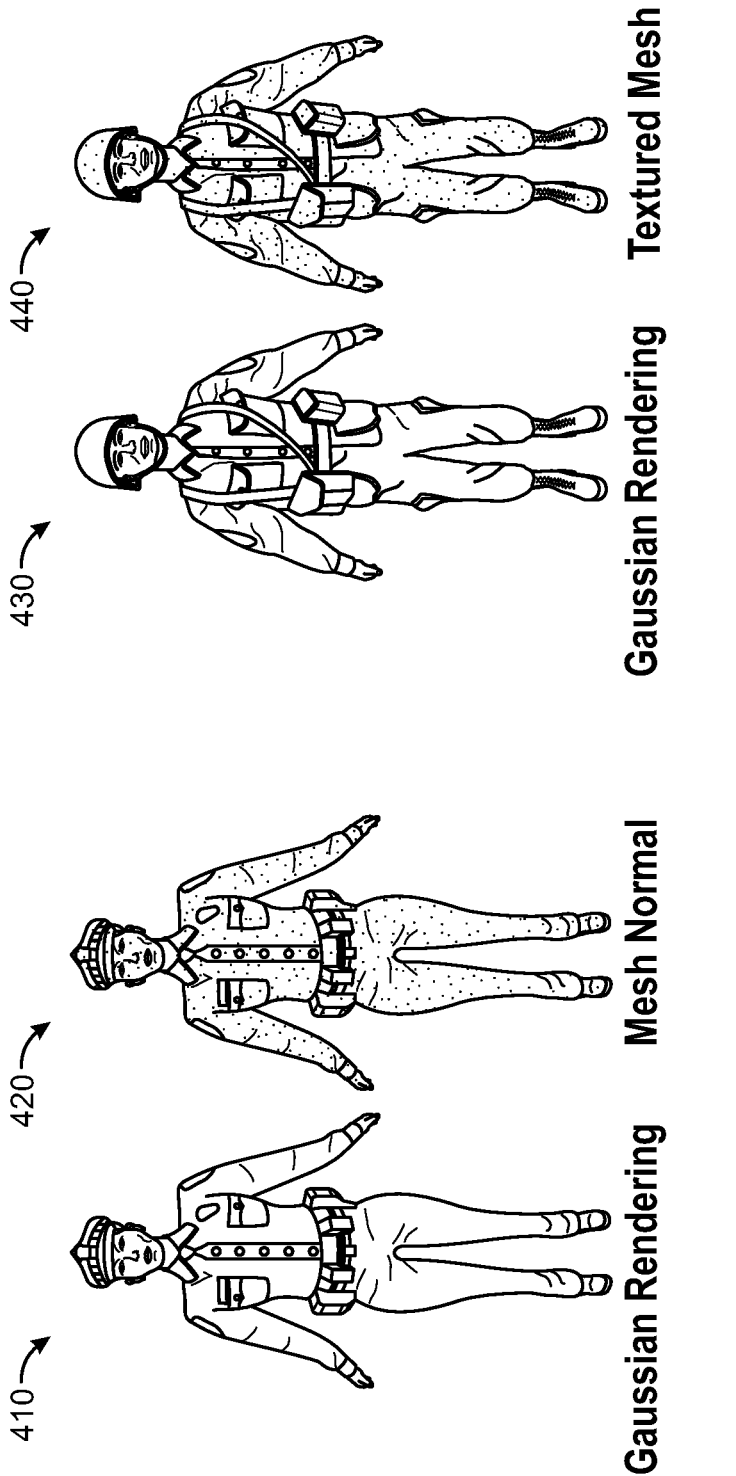
FIG. 4 is example illustrations of object renderings using a 3D object generation system (e.g., of FIGS. 1-2), in accordance with some embodiments of the present disclosure.

Referring now to FIG. 4, example illustrations of object renderings using the 3D object generation architecture of FIGS. 1-2, in accordance with some embodiments of the present disclosure. As shown, generated avatars using the 3D object generation architecture described herein and the avatars corresponding mesh normals and texture meshes. For example, the renderings illustrate the detailed surface geometry and the nuanced textural output that can be achieved. The Gaussian renderings of avatars are shown with reference to avatar 410 and 430. The mesh normal of an avatar is shown with reference to avatar 420 and the textured mesh is shown with reference to avatar 440. Accordingly, the visualization of mesh normals and textured meshes features the precision of the geometry and the fidelity of the textures-creating lifelike digital representations (e.g., as shown in the rest pose).

Figure 5:
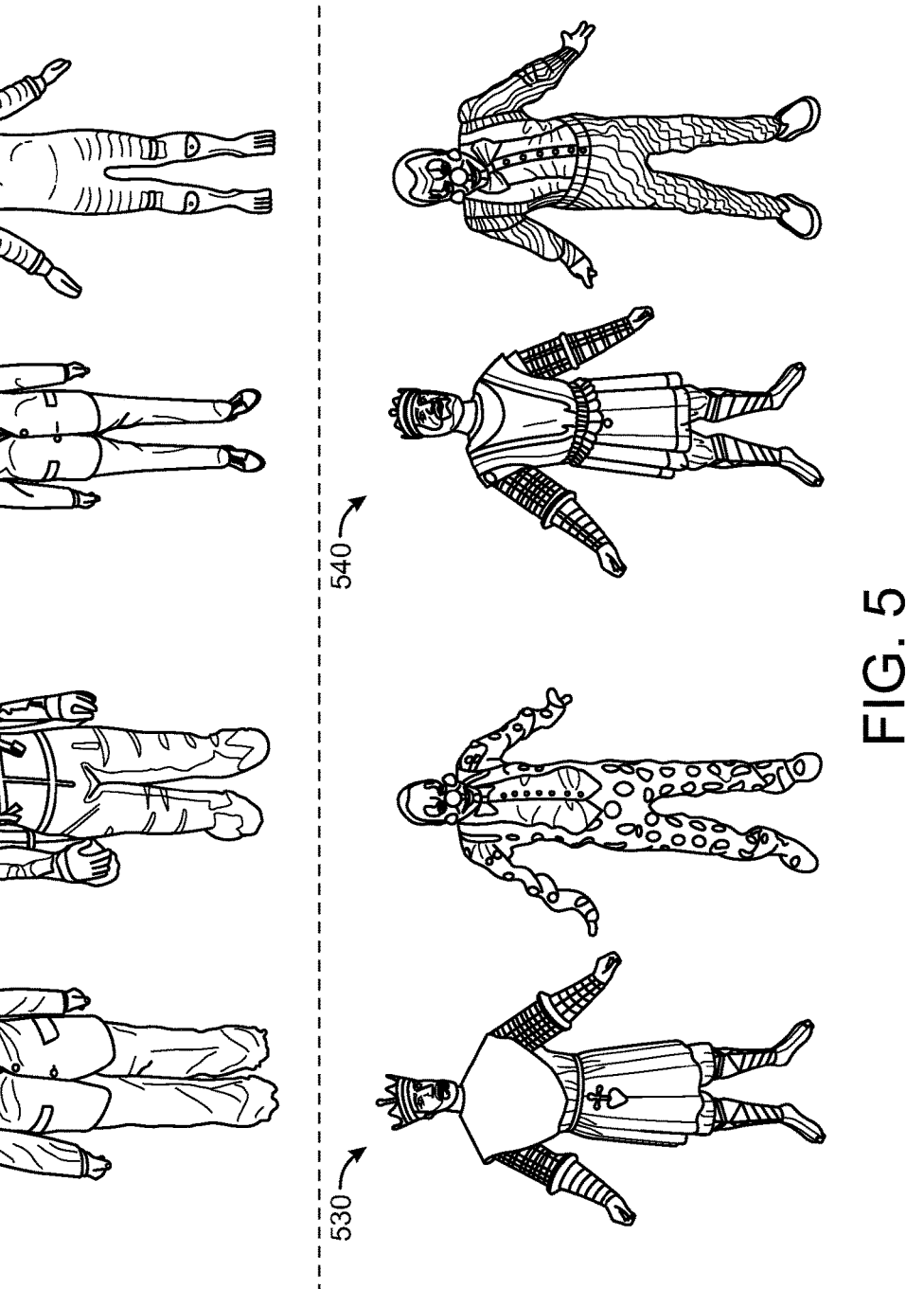
FIG. 5 is example illustrations of object renderings using a 3D object generation system (e.g., of FIGS. 1-2), in accordance with some embodiments of the present disclosure.

Referring now to FIG. 5, example illustrations of object renderings using the 3D object generation architecture of FIGS. 1-2, in accordance with some embodiments of the present disclosure. Avatars 510 are shown without implicit Gaussian attribute fields, whereas avatars 520 are depicted with implicit Gaussian attribute fields. For example, avatars 510 are depicted based on disabling the implicit Gaussian attribute field and directly optimizing the Gaussian attributes. It can be observed that the generated avatars are significantly worse than the 3D object generation architecture of FIGS. 1-2, with pronounced noise and color oversaturation. Thus, when an architecture attempts to directly optimize millions of Gaussians individually with high-variance loss like SDS, it can be challenging. In contrast, the implicit Gaussian attribute field allows a more stable and robust optimization process (e.g., as shown in avatars 520). Additionally, avatars 530 are shown without SDF-based mesh learning, whereas avatars 540 are depicted with SDF-based mesh learning. For example, avatars 510 are depicted based on disabling the SDF-based mesh learning and instead letting the Gaussian attribute field additionally output the Gaussian opacities. As shown in avatars 530, the generated avatars without mesh learning can have missing body parts and distorted body shapes, where the SDF-based mesh learning handles these issues by regularizing the underlying geometry of the Gaussian avatar (as shown in avatars 540).

Figure 6:
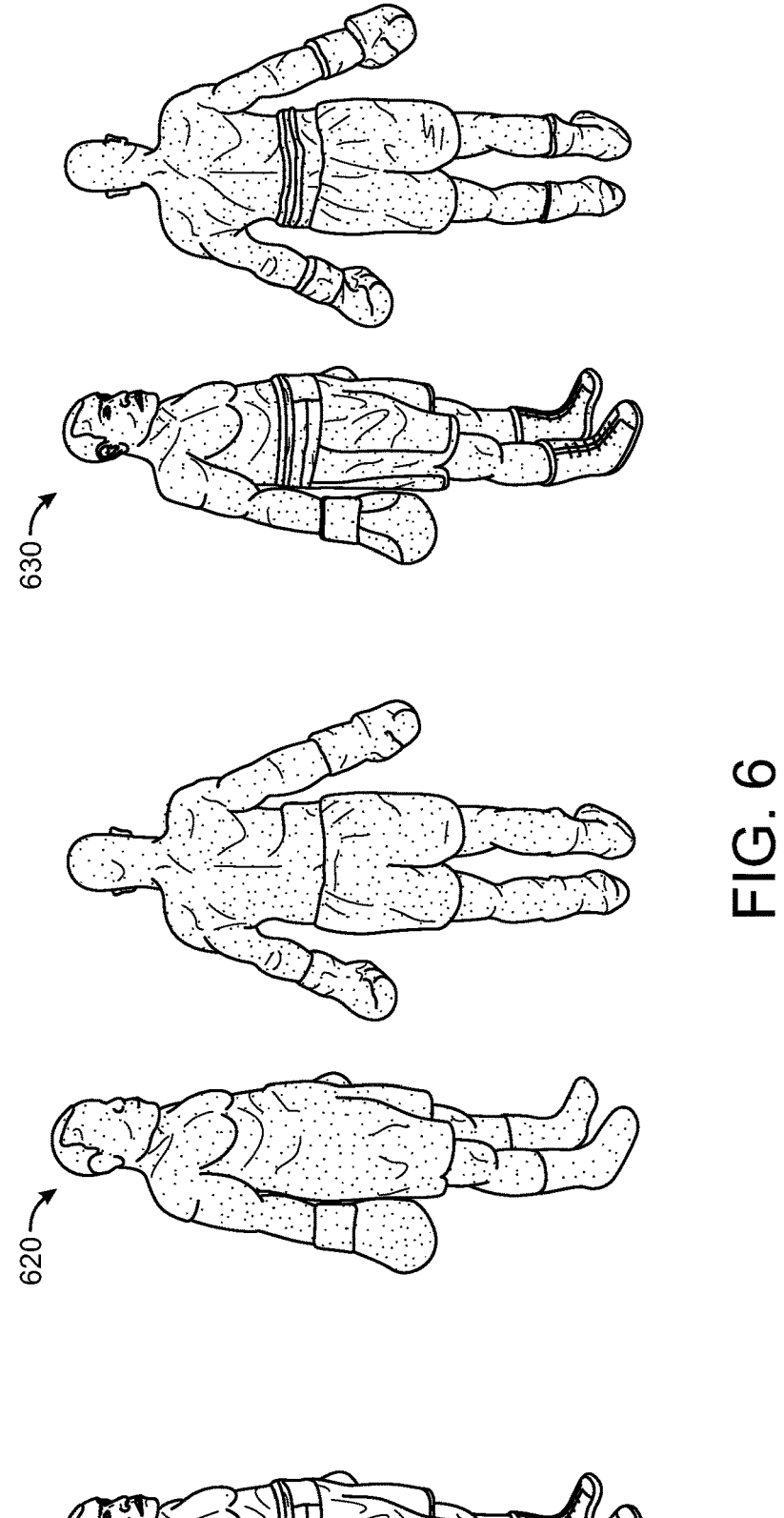
FIG. 6 is example illustrations of object renderings using a 3D object generation system (e.g., of FIGS. 1-2), in accordance with some embodiments of the present disclosure.

Referring now to FIG. 6, example illustrations of object renderings using the 3D object generation architecture of FIGS. 1-2, in accordance with some embodiments of the present disclosure. It should be understood from FIG. 6 that a technical benefit of the 3D object generation architecture of FIGS. 1-2 is that it allows for the extraction of high-quality differentiable mesh representations of Gaussian avatars. As shown, the mesh extraction approach of the 3D object generation architecture of FIGS. 1-2 (depicted in mesh 630) is compared with the Gaussian density-based approach used in DreamGaussian (depicted in mesh 620), an implementation that extract meshes from 3D Gaussians. For example, mesh 630 is provided using the mesh extraction pipeline from the Gaussian attributes in the GAvatar rendering 610 to obtain the final mesh, mesh 630. It should be understood that the mesh extracted by DreamGaussian (mesh 620) is noisier and lacks geometry details, while the approach implemented by the 3D object generation architecture of FIGS. 1-2 obtains much smoother meshes with fine-grained geometry details.

Figure 7:
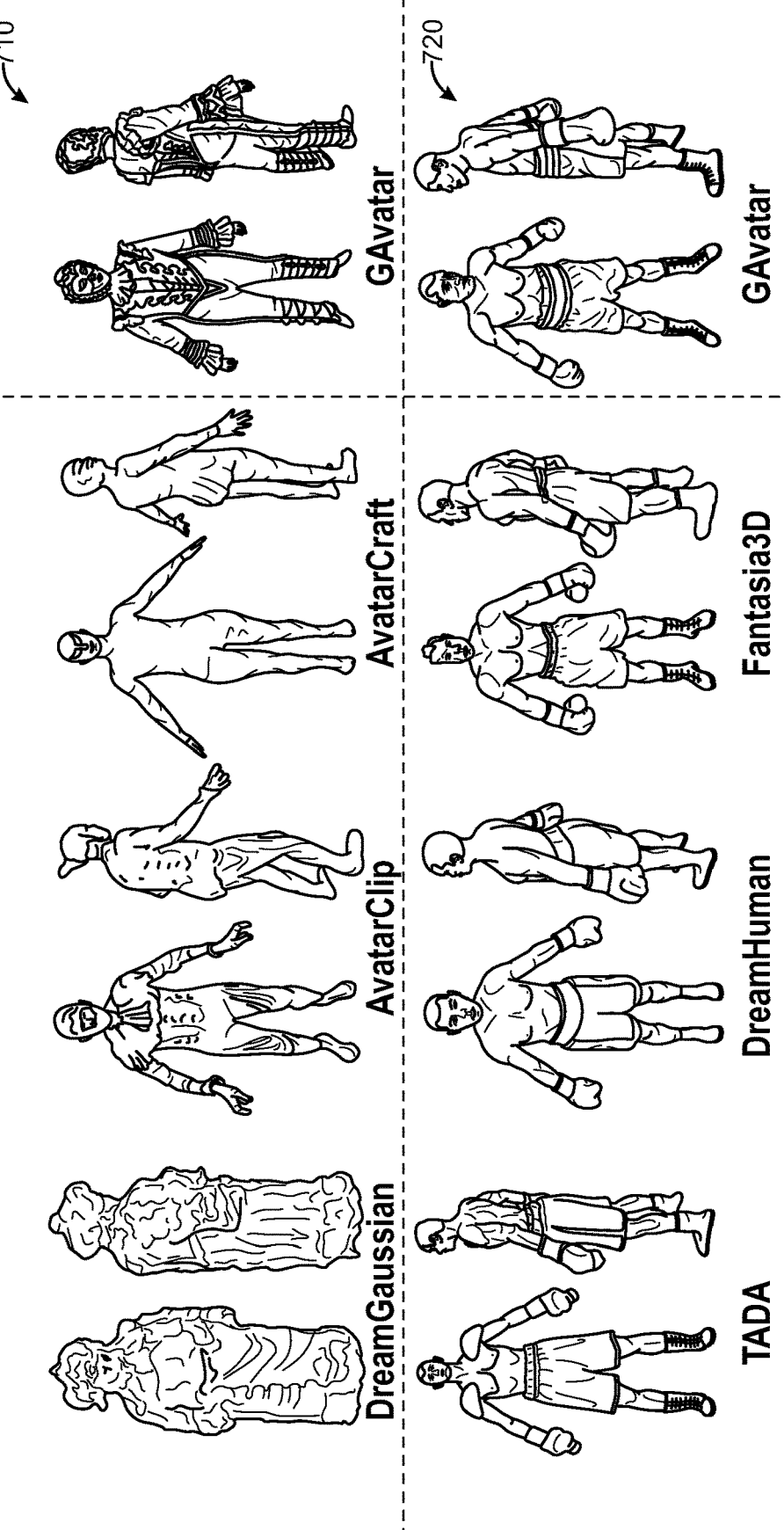
FIG. 7 is an example illustration of deficient methods of generating animatable avatar compared to the generated animatable 3D Gaussian avatar, in accordance with some embodiments of the present disclosure.

Referring now to FIG. 7, an example illustration of deficient methods of generating animatable avatar compared to the generated animatable 3D Gaussian avatar, in accordance with some embodiments of the present disclosure. For example, FIG. 7 compares animatable 3D Gaussian avatar method, GAvatar, with the other approaches: DreamGaussian, AvatarCLIP, AvatarCraft, and Fantasia3D. Additionally, for completeness, FIG. 7 also compare with contemporary works, DreamHumans and TADA. As shown, the depicted GAvatars 710 and 720 produced using the 3D object generation architecture of FIGS. 1-2 can provide higher-quality avatars both in terms of geometry and appearance. DreamGaussian, AvatarCLIP, AvatarCraft, DreamHumans, TADA, and Fantasia3D fail to model complex avatars. Accordingly, the GAvatars 710 and 720 that are generated are significantly improved avatars as compared to all methods.

Example Content Streaming System

Figure 8:
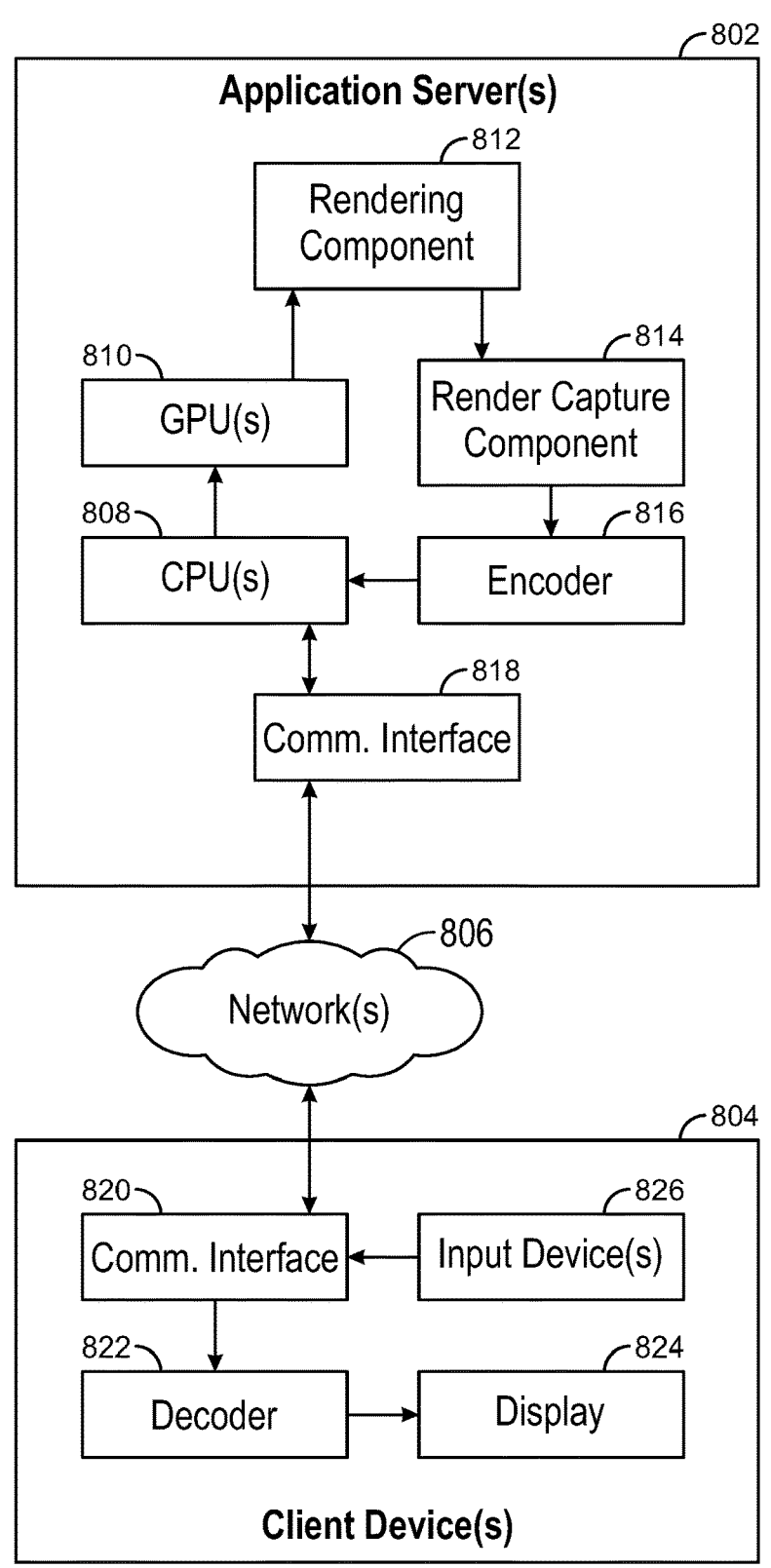
FIG. 8 is a block diagram of an example content streaming system suitable for use in implementing some embodiments of the present disclosure.

Now referring to FIG. 8, FIG. 8 is an example system diagram for a content streaming system 800, in accordance with some embodiments of the present disclosure. FIG. 8 includes application server(s) 802 (which may include similar components, features, and/or functionality to the example computing device 500 of FIG. 5), client device(s) 804 (which may include similar components, features, and/or functionality to the example computing device 500 of FIG. 5), and network(s) 806 (which may be similar to the network(s) described herein). In some implementations of the present disclosure, the system 800 may be implemented to perform model training and runtime operations. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 800 can be implemented to receive input indicating one or more features of output to be generated using a neural network model, provide the input to the model to cause the model to generate the output, and use the output for various operations including display or simulation operations.

In the system 800, for an application session, the client device(s) 804 may only receive input data in response to inputs to the input device(s), transmit the input data to the application server(s) 802, receive encoded display data from the application server(s) 802, and display the display data on the display 824. As such, the more computationally intense computing and processing is offloaded to the application server(s) 802 (e.g., rendering—in particular ray or path tracing—for graphical output of the application session is executed by the GPU(s) of the game server(s) 802). In other words, the application session is streamed to the client device(s) 804 from the application server(s) 802, thereby reducing the requirements of the client device(s) 804 for graphics processing and rendering.

For example, with respect to an instantiation of an application session, a client device 804 may be displaying a frame of the application session on the display 824 based on receiving the display data from the application server(s) 802. The client device 804 may receive an input to one of the input device(s) and generate input data in response, such as to provide prompts as input for generation of 3D avatars. The client device 804 may transmit the input data to the application server(s) 802 via the communication interface 820 and over the network(s) 806 (e.g., the Internet), and the application server(s) 802 may receive the input data via the communication interface 818. The CPU(s) may receive the input data, process the input data, and transmit data to the GPU(s) that causes the GPU(s) to generate a rendering of the application session. For example, the input data may be representative of a movement or animation of a character of the user in a game session of a game application, firing a weapon, reloading, passing a ball, turning a vehicle, etc. The rendering component 812 may render the application session (e.g., representative of the result of the input data) and the render capture component 814 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 802. In some implementations, one or more virtual machines (VMs)—e.g., including one or more virtual components, such as vGPUs, vCPUs, etc.—may be used by the application server(s) 802 to support the application sessions. The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

Example Computing Device

Figure 9:
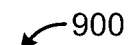
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may include one or more virtual machines (VMs), and/or any of the components thereof may include virtual components (e.g., virtual hardware components). For non-limiting examples, one or more of the GPUs 908 may include one or more vGPUs, one or more of the CPUs 906 may include one or more vCPUs, and/or one or more of the logic units 920 may include one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some implementations, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may be arranged in various topologies, including but not limited to bus, star, ring, mesh, tree, or hybrid topologies. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some implementations, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may include computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not include signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that allow the computing device 900 to communicate with other computing devices via an electronic communication network, included wired and/or wireless communications. The communication interface 910 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908. In some implementations, a plurality of computing devices 900 or components thereof, which may be similar or different to one another in various respects, can be communicatively coupled to transmit and receive data for performing various operations described herein, such as to facilitate latency reduction.

The I/O ports 912 may allow the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user, such as to generate a prompt, image data 106, and/or video data 108. In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that allow detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to allow the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
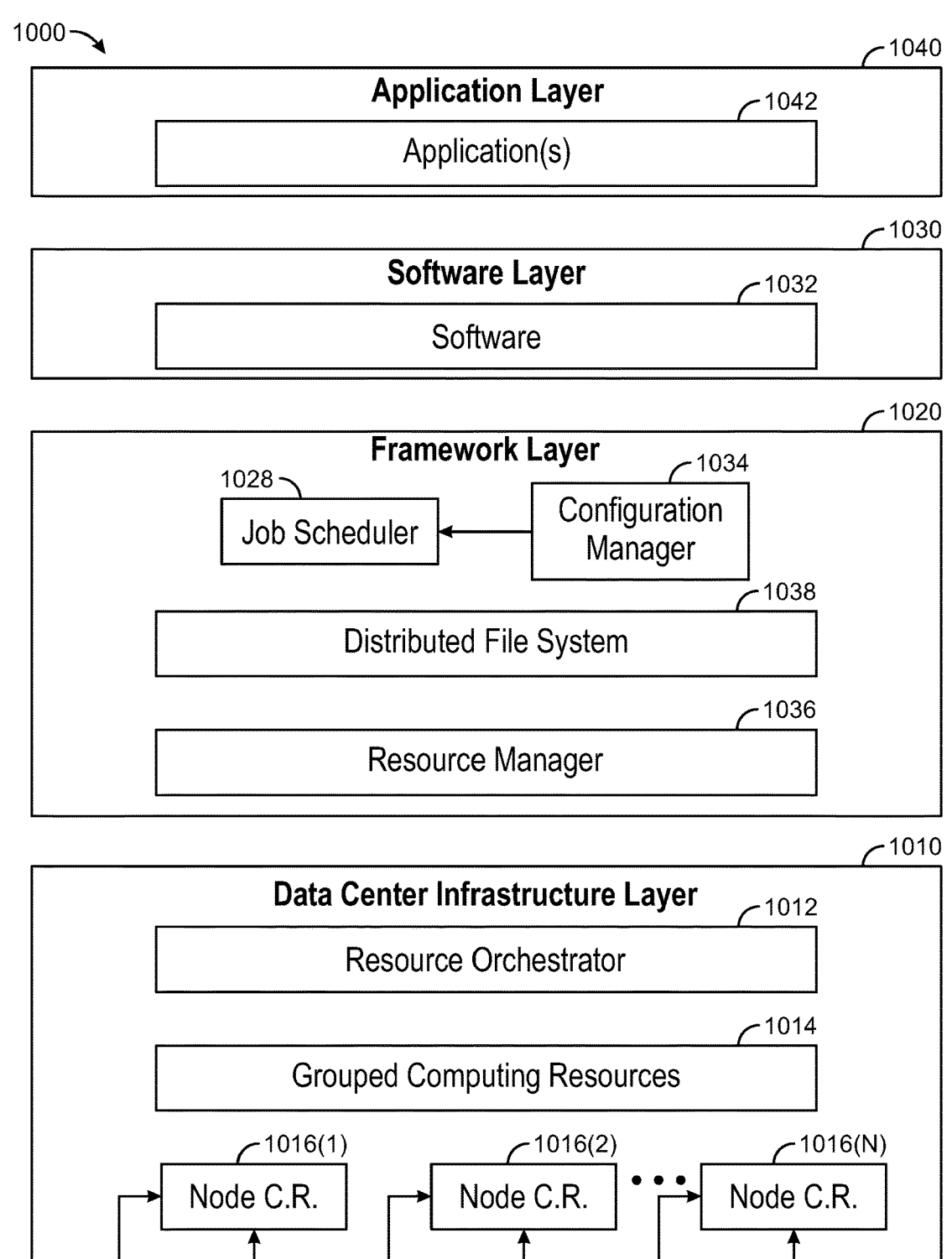
FIG. 10 is a block diagram of an example data center suitable for use in implementing some embodiments of the present disclosure.

FIG. 10 illustrates an example data center 1000 that may be used in at least one embodiments of the present disclosure, such as to implement the system 100 and/or the system 200 in one or more examples of the data center 1000. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some implementations, one or more node C.R.s from among node C.R.s 1016(1)-1016(N) may correspond to a server having one or more of the above-mentioned computing resources. In addition, in some implementations, the node C.R.s 1016(1)-1016 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1028, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1028 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1028. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to train, configure, update, and/or execute machine learning models 112.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models (e.g., train machine learning models 112) or predict or infer information using one or more machine learning models (e.g., to generate scene representation 124, motion generator 128, and/or content model 204) according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:
one or more circuits to:
assign a plurality of first elements of a three-dimensional (3D) model of a subject to a plurality of locations on a surface of the subject in an initial pose;
assign a plurality of second elements to the plurality of first elements, each second element of the plurality of second elements having an opacity corresponding to a distance between the second element and the surface of the subject;
update the plurality of second elements based at least on a target pose for the subject and one or more attributes of the subject to determine a plurality of updated second elements; and
render a representation of the subject based at least on the plurality of updated second elements.

2. The one or more processors of claim 1, wherein the one or more circuits are to update the plurality of updated second elements based at least on evaluation of one or more objective functions and the representation of the subject.

3. The one or more processors of claim 1, wherein the one or more circuits are to determine the opacity of each second element of the plurality of second elements using a signed distance function to represent the distance between the second element and the surface of the subject.

4. The one or more processors of claim 1, wherein at least one first element of the plurality of first elements comprises at least one of:

a location parameter corresponding to the location of the plurality of locations to which the at least one element is assigned;

a scale parameter indicative of a scale of the at least one first element in a 3D frame of reference in which the subject is positioned; or an orientation parameter indicative of an orientation of the subject relative to the 3D frame of reference.

5. The one or more processors of claim 1, wherein at least one second element of the plurality of second elements comprises a 3D Gaussian splatting defined in a local frame of reference of at least one corresponding first element of the plurality of first elements.

6. The one or more processors of claim 1, wherein the one or more circuits are to receive an indication of the one or more attributes of the subject as at least one of text data, speech data, audio data, image data, or video data.

7. The one or more processors of claim 1, wherein the one or more processors are to regularize the plurality of second elements based at least on position data of each second element of the plurality of second elements.

8. The one or more processors of claim 1, wherein the one or more processors are to update the plurality of updated second elements based at least on a mask determined from the representation of the subject and an alpha rendering determined from the plurality of updated second elements.

9. The one or more processors of claim 1, wherein the one or more circuits are to generate the representation to include a textured mesh of the subject.

10. The one or more processors of claim 1, wherein the one or more processors are comprised in at least one of:

a system for generating synthetic data;
a system for performing simulation operations;
a system for performing collaborative content creation for 3D assets;
a system for performing conversational AI operations;
a system comprising one or more large language models (LLMs);
a system comprising one or more visual language models (VLMs);
a system for performing digital twin operations;
a system for performing light transport simulation;
a system for performing deep learning operations;
a system implemented using an edge device;
a system implemented using a robot;
a control system for an autonomous or semi-autonomous machine;
a perception system for an autonomous or semi-autonomous machine;
a system incorporating one or more virtual machines (VMs);
a system implemented at least partially in a data center; or
a system implemented at least partially using cloud computing resources.

11. A system comprising:

one or more processors to execute operations comprising:

assign a plurality of first elements of a three-dimensional (3D) model of a subject to a plurality of locations on a surface of the subject in an initial pose;

assign a plurality of second elements to the plurality of first elements, each second element of the plurality of second elements having an opacity corresponding to a distance between the second element and the surface of the subject;

update the plurality of second elements based at least on a target pose for the subject and one or more attributes of the subject to determine a plurality of updated second elements; and render a representation of the subject based at least on the plurality of updated second elements.

12. The system of claim 11, wherein the one or more processors are to update the plurality of updated second elements based at least on evaluation of one or more objective functions and the representation of the subject.

13. The system of claim 11, wherein the one or more processors are to determine the opacity of each second element of the plurality of second elements using a signed distance function to represent the distance between the second element and the surface of the subject.

14. The system of claim 11, wherein at least one first element of the plurality of first elements comprises at least one of:

a location parameter corresponding to the location of the plurality of locations to which the at least one element is assigned;

a scale parameter indicative of a scale of the at least one first element in a 3D frame of reference in which the subject is positioned; or an orientation parameter indicative of an orientation of the subject relative to the 3D frame of reference.

15. The system of claim 11, wherein at least one second element of the plurality of second elements comprises a 3D Gaussian splatting defined in a local frame of reference of a corresponding at least one first element of the plurality of first elements.

16. The system of claim 11, wherein the one or more processors are to receive an indication of the one or more attributes of the subject as at least one of text data, speech data, audio data, image data, or video data.

17. The system of claim 11, wherein the one or more processors are to regularize the plurality of second elements based at least on position data of each second element of the plurality of second elements.

18. The system of claim 11, wherein the one or more processors are to update the plurality of updated second elements based at least on a mask determined from the representation of the subject and an alpha rendering determined from the plurality of updated second elements, and wherein the one or more processors are to generate the representation to include a textured mesh of the subject.

19. A method, comprising:

assigning, using one or more processors, a plurality of first elements of a three-dimensional (3D) model of a subject to a plurality of locations on a surface of the subject in an initial pose;

assigning, using the one or more processors, a plurality of second elements to the plurality of first elements, each second element of the plurality of second elements having an opacity corresponding to a distance between the second element and the surface of the subject;

updating, using the one or more processors, the plurality of second elements based at least on a target pose for the subject and one or more attributes of the subject to determine a plurality of updated second elements; and rendering, using the one or more processors, a representation of the subject based at least on the plurality of updated second elements.

20. The method of claim 19, wherein the updating the plurality of updated second elements is based at least on evaluation of one or more objective functions and the representation of the subject, and wherein the determination of the opacity of each second element of the plurality of second elements comprises using a signed distance function to represent the distance between the second element and the surface of the subject.

\* \* \* \* \*